United States Patent
Jahanbin et al.

(10) Patent No.: US 10,953,608 B2
(45) Date of Patent: Mar. 23, 2021

(54) STRUCTURAL HEALTH MONITORING OF CURVED COMPOSITE STRUCTURES USING ULTRASONIC GUIDED WAVES

(71) Applicant: The Boeing Company, Chicago, IL (US)

(72) Inventors: Shahrooz Mark Jahanbin, Mukilteo, WA (US); Jeong-Beom Ihn, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 349 days.

(21) Appl. No.: 16/059,119

(22) Filed: Aug. 9, 2018

(65) Prior Publication Data
US 2020/0047425 A1    Feb. 13, 2020

(51) Int. Cl.
*B29C 65/82* (2006.01)
*B29C 65/00* (2006.01)
*B29C 65/48* (2006.01)

(52) U.S. Cl.
CPC .......... *B29C 65/8276* (2013.01); *B29C 65/48* (2013.01); *B29C 66/45* (2013.01)

(58) Field of Classification Search
CPC ...... B29C 65/8276; B29C 65/48; B29C 66/45
See application file for complete search history.

(56) References Cited

U.S. PATENT DOCUMENTS

| | | | |
|---|---|---|---|
| 4,848,159 A | 7/1989 | Kennedy et al. | |
| 5,408,881 A | 4/1995 | Piche et al. | |
| 10,697,941 B2* | 6/2020 | Jack | G01N 29/36 |
| 2012/0265449 A1 | 10/2012 | Ihn et al. | |
| 2014/0232552 A1 | 8/2014 | Kessler et al. | |
| 2014/0327433 A1 | 11/2014 | Anway et al. | |
| 2016/0077027 A1 | 3/2016 | Sweers et al. | |
| 2016/0320353 A1* | 11/2016 | Biwa | G01N 29/11 |
| 2018/0340858 A1* | 11/2018 | Jahanbin | G01N 29/4427 |

FOREIGN PATENT DOCUMENTS

| | | |
|---|---|---|
| EP | 1336842 A2 | 8/2003 |
| GB | 2563978 A | 1/2019 |
| WO | 2010041005 A2 | 4/2010 |

OTHER PUBLICATIONS

British Combined Search and Examination Report dated Jan. 17, 2020 in British Application No. GB1910712.7 (British counterpart to the instant patent application).

(Continued)

*Primary Examiner* — Bryan Bui
(74) *Attorney, Agent, or Firm* — Ostrager Chong Flaherty & Broitman P.C.

(57) ABSTRACT

Systems and methods for non-destructive inspection of curved composite laminate structures using interface guided waves. In particular, if the curved composite laminate structure has a noodle, then the noodle area may be inspected using interface guided waves. The systems and methods provide a repeatable and reliable nondestructive technique for monitoring the structural health of the noodle area of an adhesively bonded curved composite laminate structure by comparing detection data acquired from an inspected curved composite laminate structure with prediction data derived using a simulated curved composite laminate structure.

23 Claims, 15 Drawing Sheets

(56) References Cited

OTHER PUBLICATIONS

Gardner et al., "Ultrasonic Guided Wave Inspection of an Interface Between an Anisotropic Layer and a Metallic Half Space," The 39th Annual Review of Progress in Quantitative Nondestructive Evaluation, AIP Conf. Proc., 1511 (2013), pp. 207-214.
Manogharan et al., "Longitudinal guided waves confined in radius filler regions of composite joints," J. Acoustical Society of America, 140(1), (2016), pp. 334-343.
Jin, Wang and Kishimoto, Basic properties of Rayleigh surface wave propagation along curved surfaces, International Journal of Engineering Science, 43 (2005), pp. 250-261.
Li, "On approximate analytic expressions for the velocity of Rayleigh waves," Wave Motion, 44 (2006), pp. 120-127.
Jin, Wang and Wang, "The Bleustein-Gulyaev (B-G) wave in a piezoelectric layered half-space," International Journal of Engineering Science, 39 (2001), pp. 1271-1285.
Shen and Wang, "Simulations of Rayleigh's Wave on Curved Surface", Applied Mathematics, 4 (2013), pp. 963-967.
Harris, "Rayleigh wave propagation in curved waveguides," Wave Motion, 36 (2002), pp. 425-441.
Jahanbin et al., "Interface Waves in Hybrid Metal-Composite Structures", Conf. Smart Materials, Adaptive Structures and Intelligent Systems, ASME 2016 SMASIS, Sep. 28-30, 2016, Stowe, Vermont, USA.

\* cited by examiner

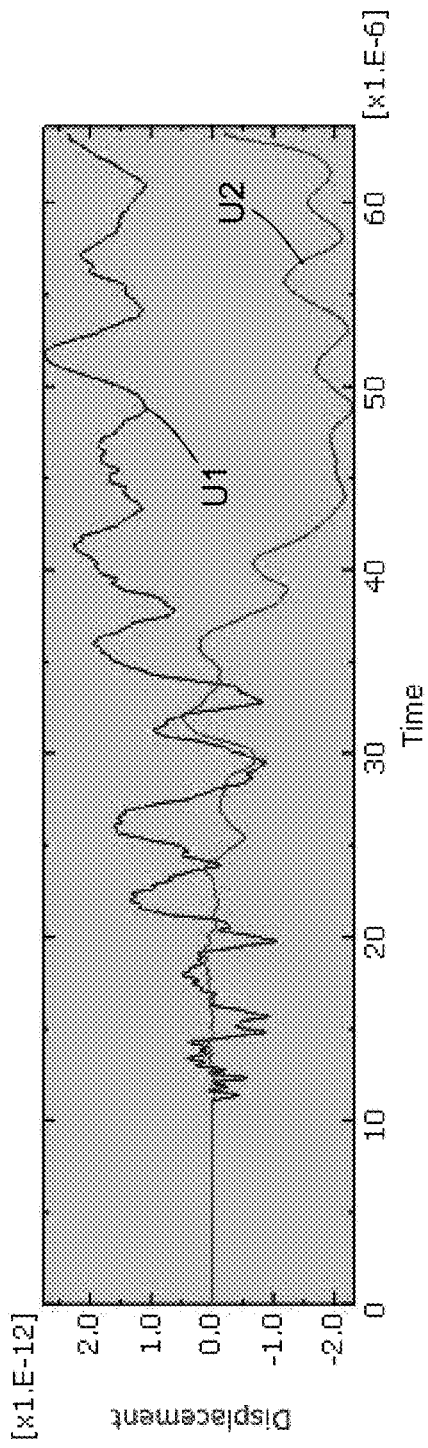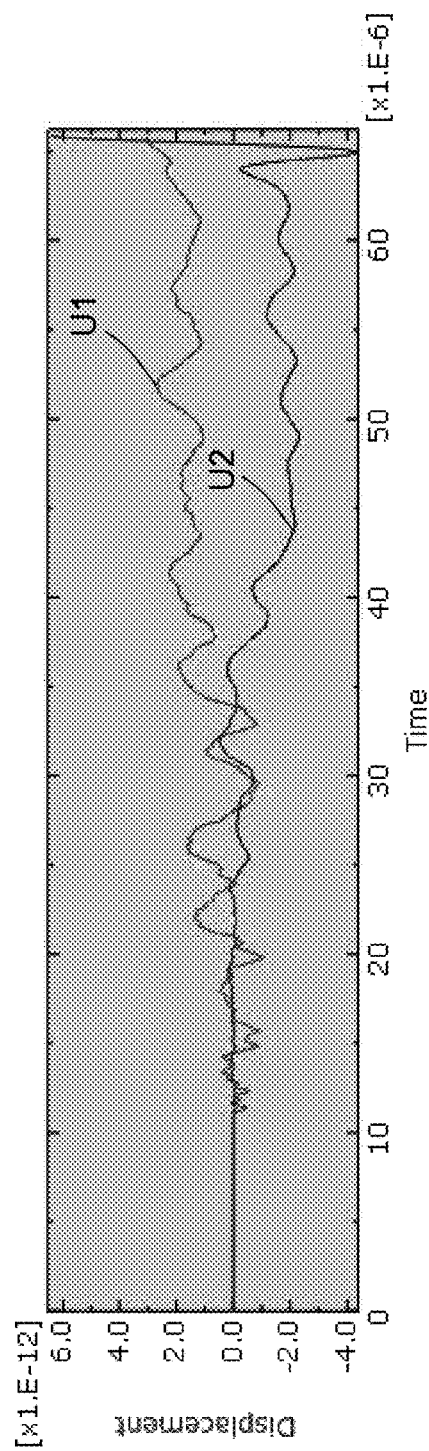
FIG. 8C
FIG. 8D

STRUCTURAL HEALTH MONITORING OF CURVED COMPOSITE STRUCTURES USING ULTRASONIC GUIDED WAVES

BACKGROUND

This disclosure generally relates to systems and methods for structural health monitoring of adhesively bonded composite structures. In particular, this disclosure relates to ultrasonic inspection of curved composite laminate structures made of fiber-reinforced composites.

The inspection of co-cured and co-bonded interfaces at curvature and bends in a curved composite laminate structure has typically involved point-by-point ultrasonic inspection using angle beam transducers or shoes, which is a very tedious procedure. This method of inspection is also not reliable because the method depends on the back-wall reflection of waves at the sections where the structure thickness is not constant but rather is changing with the curvature. Also there is some curvature correction factor involved, which adds to the difficulty of determining the size and location of anomalies in the curved composite laminate structure.

Most composite airframe components, such as skinstringer and web-flange attachment of beams and channels, form structural elements which are known as "noodles". Noodles or radius fillers are used to fill-out the radius bend of curved composite laminate structures. Noodles are constructed from composites with orientations different from the primary laminated structure. Noodles are vulnerable to many forms of anomalies. Noodles are also located in areas that might be inconvenient to inspect by typical nondestructive methods.

Typical nondestructive inspection using ultrasonic waves is costly, time consuming and not very effective and accurate for inspection of curvatures and noodles due to complex geometry and location. The propagation path of ultrasonic waves could be erroneous due to shape, location and size of the noodle. For example, pulse-echo inspection only can be performed over the flat (base) side of the noodles. Similarly pitch-catch inspection at the radius on each side of the stringer might not be able to perform well because the small radii require small specialized transducers.

It would be desirable to develop a technique for nondestructively inspecting a noodle area inside a curved composite laminate structure.

SUMMARY

The subject matter disclosed herein is directed to systems and methods for nondestructive inspection of curved composite laminate structures using interface guided waves. In particular, if the curved composite laminate structure has a noodle, then the noodle area may be inspected using interface guided waves. The systems and methods provide a repeatable and reliable nondestructive technique for monitoring the structural health of the noodle area of an adhesively bonded curved composite laminate structure by comparing detection data acquired from an inspected curved composite laminate structure with prediction data derived using a simulated curved composite laminate structure.

Interface guided waves (hereinafter "guided waves") are acoustic waves that are guided by boundaries (e.g., a curved interface). A guided wave is a converted mode of surface wave which can be used to evaluate the bonding condition in composite joints. The velocity of a guided wave is higher than a surface wave for the same material, so measuring time-of-flight changes are useful in disbond damage detection. Both guided wave and surface waves penetrate into solid (depending on wavelength) and may be used for sub-surface or near-surface damage detection. The time of flight and velocity of the guided wave are sensitive to the size of the anomaly. The principles of attenuation and scattering of wave fronts suggest that guided waves in a certain frequency range can detect several anomalies when the wavelength is compatible with the bend radius of the structure.

The methods disclosed herein generate guided waves which propagate along the curved interface and bended section of a curved composite laminate structure. A relationship between the frequency, corresponding to wavelength, of the guided waves and the curvature radius is established for ensuring that the path of the guided waves follows the bend profile and that the guided waves penetrate deep enough through the thickness of the curved composite laminate structure to detect all of the interfacial as well as near-surface and subsurface anomalies.

The embodiments disclosed in some detail below may be advantageously used in the inspection of airframes formed partly or completely from composite materials such as fiber-reinforced polymeric materials. Thus, for example and without limitation, various stringers and the skins to which the stringers are adhesively bonded may be made of composite laminates that are co-bonded or co-cured together using techniques and adhesives well known in the art of composite airframe fabrication.

Although various embodiments of systems and methods for nondestructive inspection of a noodle area inside an adhesively bonded curved composite laminate structure are described in some detail later herein, one or more of those embodiments may be characterized by one or more of the following aspects.

One aspect of the subject matter disclosed in detail below is a method for structural health monitoring of a curved composite laminate structure comprising a noodle, the method comprising: (a) simulating a curved composite laminate structure consisting of a noodle having first, second and third edges, a first bended section consisting of a first web, a first flange and a first radius connecting the first web to the first flange and joined to the noodle along a first curved interface that starts at the first edge, a second bended section consisting of a second web joined to the first web, a second flange and a second radius connecting the second web to the second flange and joined to the noodle along a second curved interface that starts at the second edge, and a composite laminate joined to the first flange by a first portion of an adhesive bondline, joined to the noodle by a second portion of the adhesive bondline, and joined to the second flange by a third portion of the adhesive bondline; (b) simulating propagation of ultrasonic waves that travel along the first portion of the adhesive bondline of the simulated curved composite laminate structure, separate at the first edge of the noodle of the simulated curved composite laminate structure, and then travel separately along the first interface and the second portion of the adhesive bondline of the simulated curved composite laminate structure; (c) storing reference data in a non-transitory tangible computer-readable storage medium, which reference data represents a simulated wave characteristic of simulated ultrasonic waves that have propagated through the simulated curved composite laminate structure from a first surface area of the composite laminate disposed adjacent to the first flange to a second surface area of the composite laminate disposed adjacent to the second flange; (d) generating ultrasonic waves which propagate through an actual curved composite laminate structure having a noodle, first and second bended sections and a composite laminate with material properties and a construction that is the same as material properties and a construction of the simulated curved composite laminate structure; (e) converting ultrasonic waves which have propagated through the actual curved composite laminate structure from a first surface area of the composite laminate disposed adjacent to a first flange of the first bended section to a second surface area of the composite laminate disposed adjacent to the second flange of the second bended section into measurement electrical signals; (f) processing the measurement electrical signals to derive measurement data representing an empirical wave characteristic of actual ultrasonic waves that have propagated from the first surface area to the second surface area of the composite laminate of the actual curved composite laminate structure; (g) storing the measurement data in the non-transitory tangible computer-readable storage medium; (h) determining a difference between the measurement data and the reference data; and (i) classifying the actual curved composite laminate structure as being anomalous or not anomalous in dependence on the difference. In accordance with one proposed implementation, a ratio of a radius of curvature of the first radius divided by a wavelength of the ultrasonic waves is approximately equal to 3.5. In accordance with one embodiment, the wave characteristic is time of travel of the ultrasonic waves as the ultrasonic waves propagate from the first surface area to the second surface area of the composite laminate of the actual curved composite laminate structure. The method may further comprise estimating a size of an anomaly in the actual curved composite laminate structure based on a time of flight. The method further comprises repairing or replacing the actual curved composite laminate structure.

Another aspect of the subject matter disclosed in detail below is a method for structural health monitoring of a stringer-skin assembly, the method comprising: (a) simulating a stringer-skin assembly consisting of a noodle having a quasi-triangular profile, first and second bended sections having respective webs adhesively bonded together, and a skin adhesively bonded to the noodle and to respective flanges of the first and second bended sections along a simulated adhesive bondline; (b) simulating ultrasonic waves that propagate along the simulated adhesive bondline; (c) storing reference data in a non-transitory tangible computer-readable storage medium, which reference data represents a simulated wave characteristic of the simulated ultrasonic waves that propagate along the simulated adhesive bondline; (d) generating ultrasonic waves which propagate through an actual stringer-skin assembly consisting of a noodle, first and second bended sections and a composite laminate with material properties and a construction that is the same as material properties and a construction of the simulated stringer-skin assembly; (e) converting generated ultrasonic waves that have propagated along an actual adhesive bondline of the actual stringer-skin assembly into measurement electrical signals; (f) processing the measurement electrical signals to derive measurement data representing an empirical wave characteristic of the generated ultrasonic waves that propagated along the actual adhesive bondline; (g) storing the measurement data in the non-transitory tangible computer-readable storage medium; (h) determining a difference between the measurement data and the reference data; and (i) classifying the actual skin-stringer assembly as having an anomaly or not having an anomaly in dependence on the difference.

A further aspect is a method for structural health monitoring of a curved composite laminate structure comprising a noodle, the method comprising: (a) simulating an undamaged curved composite laminate structure including a noodle having straight and curved adhesive bondlines; (b) simulating propagation of an ultrasonic guided wave of a specified frequency which is guided through the undamaged structure and around the noodle by the straight and curved adhesive bondlines; (c) simulating respective damaged versions of the same structure having respective simulated defects of different types; (d) simulating propagation of an ultrasonic guided wave of the specified frequency which is guided through the damaged structure and around the noodle by the straight and curved adhesive bondlines; (e) storing reference data in a non-transitory tangible computer-readable storage medium, which reference data represents wave characteristics of simulated ultrasonic guided waves which have propagated through the damaged and undamaged structures and around the noodle and arrived at a sensing location on a surface of the simulated structure; (f) generating an ultrasonic guided wave of the specified frequency which propagates through an actual curved composite laminate structure including a noodle having straight and curved adhesive bondlines, wherein the actual curved composite laminate structure has material properties which are the same as or similar to material properties of the simulated curved composite laminate structure; (g) converting ultrasonic guided waves which have propagated through the actual curved composite laminate structure and around the noodle and arrived at a sensing location on a surface of the actual curved composite laminate structure into measurement electrical signals; (h) processing the measurement electrical signals to derive measurement data representing an empirical wave characteristic; (i) storing measurement data representing the empirical wave characteristic in the non-transitory tangible computer-readable storage medium; (j) comparing the measurement data to the reference data; and (k) classifying the noodle area as being damaged or not in dependence on the results of comparing the measurement data to the reference data. If a determination is made that the noodle area is not damaged, then the actual curved composite laminate structure is neither repaired nor replaced. If a determination is made that the noodle area is damaged, then a flag is generated and thereafter the damaged actual curved composite laminate structure is either repaired or replaced.

Yet another aspect is a structural health monitoring system comprising: a wave generator, a pulser configured to send pulses to the wave generator, a wave sensor, a receiver configured to receive electrical signals from the wave sensor, and a computing system configured with simulation software, system control software for controlling the pulser and receiver, signal analysis software for analyzing signals output by the receiver, and a non-transitory tangible computer-readable storage medium. The simulation software is configured to enable the computing system to perform the following operations: simulating an undamaged curved composite laminate structure including a noodle having straight and curved adhesive bondlines; simulating propagation of an ultrasonic guided wave of a specified frequency which is guided through the undamaged structure and around the noodle by the straight and curved adhesive bondlines; simulating respective damaged versions of the same structure having respective simulated defects of different types; simulating propagation of an ultrasonic guided wave of the specified frequency which is guided through the damaged structure and around the noodle by the straight and curved adhesive bondlines; and storing reference data in a non-transitory tangible computer-readable storage medium, which reference data represents wave characteristics of simulated ultrasonic guided waves which have propagated through the damaged and undamaged structures and around the noodle and arrived at a sensing location on a surface of the simulated structure. The system control software is configured to enable the computing system to perform the following operations: causing the wave generator to generate an ultrasonic guided wave of the specified frequency which propagates through an actual curved composite laminate structure including a noodle having straight and curved adhesive bondlines, wherein the actual curved composite laminate structure has material properties which are the same as or similar to material properties of the simulated curved composite laminate structure; and causing the wave sensor to convert ultrasonic guided waves which have propagated through the actual curved composite laminate structure and around the noodle and arrived at a sensing location on a surface of the actual curved composite laminate structure into measurement-time electrical signals. The signal analysis software is configured to enable the computing system to perform the following operations: processing the measurement electrical signals to derive measurement data representing an empirical wave characteristic; and storing measurement data representing the empirical wave characteristic in the non-transitory tangible computer-readable storage medium. The system control software is further configured to enable the computing system to perform the following operations: comparing the measurement data to the reference data; and classifying the noodle area as being damaged or not in dependence on the results of comparing the measurement data to the reference data.

Other aspects of systems and methods for nondestructive inspection of a noodle area inside an adhesively bonded curved composite laminate structure are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

FIGS. 8A through 8F are displacement-time graphs showing the magnitude of displacement U1 in the X direction and U2 in the Y direction in the time domain for different simulated composite laminate strictures having noodles in six different states: undamaged (FIG. 8A); 2.54-mm crack (FIG. 8B); 5.08-mm crack (FIG. 8C); 7.62-mm crack (FIG. 8D); 10.16-mm crack (FIG. 8E); and 12.7-mm crack in noodle (FIG. 8F).

Reference will hereinafter be made to the drawings in which similar elements in different drawings bear the same reference numerals.

DETAILED DESCRIPTION

Figure 1:
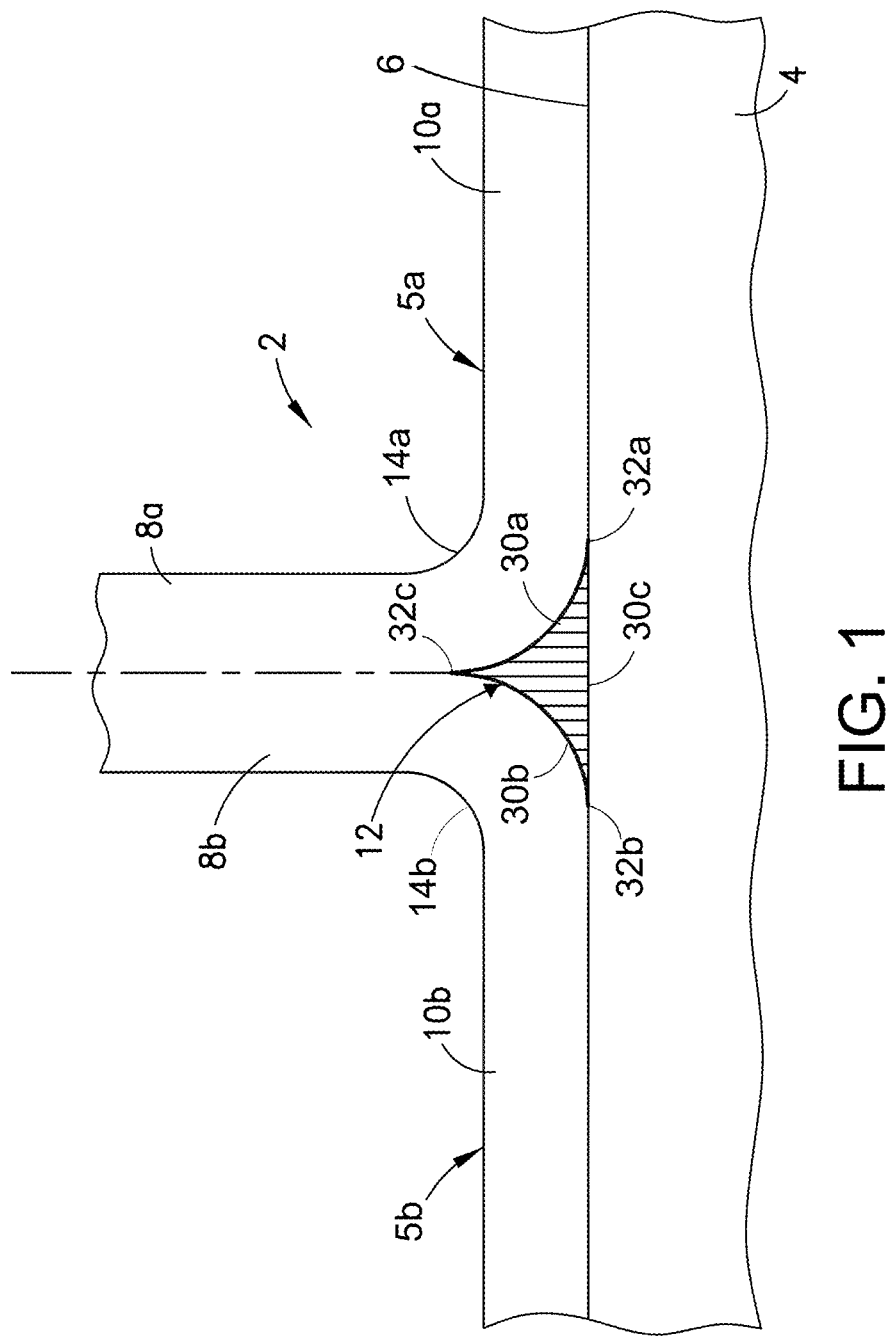
FIG. 1 is a diagram representing an end view of a typical interface between a stringer and a skin made of composite material.

For the purpose of illustration, systems and methods for structural health monitoring of noodles inside curved composite laminate structures will now be described in detail. However, not all features of an actual implementation are described in this specification. A person skilled in the art will appreciate that in the development of any such embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Guided wave simulations can be used to detect bonding defects in hybrid structure joints. The velocity of the guided wave and the reflected waves provide information quantifying the simulated anomaly, e.g., size and location, by baselining the wave behavior with respect to the undamaged and damaged condition of the simulated structure.

Theoretical studies suggest that the guided waves propagate with speeds lower than the lowest speeds of bulk waves in the denser media. The finite element simulations of the performance of adhesively bonded joints showed that the velocities of the guided waves depend on the frequency of excitation, material orientation, and specific material properties at the interface boundary. The properties and quality of the adhesive layer can change the velocity of the guided wave. The velocity of the guided wave increases due to the presence of the adhesive layer and is a function of the substrate/adhesive interfaces and the density, viscosity and elasticity of the adhesive layer.

The subject matter disclosed in some detail hereinafter is directed to systems and methods for non-destructive inspection of a noodle area inside an adhesively bonded curved composite laminate structure using guided waves. The method determines the quality of adhesive bonds between two materials by injecting a high-frequency (e.g., 5 MHz or higher) ultrasonic signal and measuring a characteristic of the ultrasonic guided waves which propagate along and are guided by the interfaces between the bonded materials and the adhesive.

The method begins with simulation of an adhesively bonded curved composite laminate structure having a noodle using a finite element model. Also propagation of guided ultrasonic waves along the curved adhesive bondline is simulated to derive guided wave predicted properties. During ultrasonic inspection of the actual curved composite laminate structure, guided wave measured properties are derived. The quality of the curved adhesive bondline is determined by comparing the empirical guided wave measured properties to the simulated guided wave predicted properties. In accordance with one embodiment, the property of interest is time of travel (inversely proportional to velocity).

The inspection methods disclosed in some detail below are based on the use of guided waves to evaluate the damage along various adhesive bondlines in a noodle area of a curved composite laminate structure. In particular embodiments, the disclosed inspection methods use guided waves for bonding assessment of curved composite laminate structures having a curved interface formed by a composite laminate and a noodle (also referred to herein as "radius filler"). Guided waves pose good characteristics, such as large displacement and high energy, at the interfaces of two materials. These characteristics result in the guided waves exhibiting high sensitivity to interfacial damages of curved composite laminate structures at selected modes and frequencies, compared to other ultrasonic waveforms, which typically propagate in a thickness direction. An ultrasonic method using guided waves for the inspection of noodles inside curved composite laminate structures will now be described in some detail with references to the drawings.

The technology disclosed herein employs study results relating to the propagation of ultrasonic guided waves in a skin-stringer configuration that incorporates a noodle. As part of the technique disclosed herein, propagation of a surface acoustic wave on a curved outer surface is modeled. One purpose is to identify effective guided waves for a structural curvature radius inspection. The guided wave propagation path along the bondline of the skin-stringer and noodle area is simulated numerically using finite element modeling. Typical damage scenarios in the noodle area are modeled. The ultrasonic guided wave behavior may be studied for several cases to characterize noodle damages. The attenuation and scattering of wave fronts suggest that the guided wave can detect several types of anomalies in certain frequency ranges when the wavelength is compatible with the bend radius of the curved composite laminate structure. Also the location of anomalies in the noodle area can be found by reflection sources from different anomaly sizes (e.g., the length of a crack). Such studies enable formulation of a generalized solution of the noodle inspection problem and in connection with examination of curved composite laminate surfaces as part of the development of a structural health monitoring system.

Laminated composites form complex structural geometries in aircraft structures and aerospace applications such as skin-stringer bonds, chord-to-web interfaces of beams, columns, plates and many other locations. The curved interfaces and bended sections of composite laminates (such as stacks of adhesively bonded carbon fiber-reinforced plastic plies) are critical areas, because each ply is exposed to different stress-strain, deformation and deflections which cause interlaminar (disbond) and intralaminar (delamination) anomalies. Radius filler, also known as noodle, fills the interface between plies in curved and bended composite laminate joints. Radius fillers or noodles are constructed in different shapes and forms, typically with a quasi-triangular (e.g., hyperbolic triangle) cross section.

FIG. 1 is a diagram representing an end view of a typical interface between a stringer 2 (in this example, a blade stringer) and a skin 4 (in this example, a skin panel), each made of composite material. The inspection technique disclosed herein can be applied with equal efficacy to other types of composite stringers and to other composite structures having curved interfaces, bended sections and a noodle.

The stringer 2 depicted in FIG. 1 includes a sheet formed by two generally elongated, adjacent, parallel webs 8a and 8b. Each of the webs 8a and 8b may comprise a respective multiplicity of composite plies between respective layers of resin-infused fabric. The stringer 2 further includes a pair of flanges 10a and 10b which extend outwardly from the respective webs 8a and 8b at respective web/flange junctions referred to herein as radii 14a and 14b. The plane of each flange 10a and 10b may be disposed in generally perpendicular relationship with respect to the plane of the corresponding web 8a, 8b. However, the angle between web 8a and flange 10a need not be 90 degrees. The stringer 2 depicted in FIG. 1 is adhesively bonded to skin 4 by means of a layer of adhesive (hereinafter "adhesive bondline 6"). More specifically, the flanges 10a and 10b are bonded to the skin 4 by means of the adhesive bondline 6.

In the example structure depicted in FIG. 1, a channel bounded by the radii 14a and 14b and the skin 4 is filled with a noodle 12 made of composite material. The noodle 12 has a quasi-triangular (e.g., hyperbolic triangle) cross section and is constructed from a unidirectional composite in which fibers are perpendicular to the paper. The noodle 12 interfaces with the radius 14a at a curved radius/noodle interface 30a, with the radius 14b at a curved radius/noodle interface 30b and with the skin 4 at the straight skin/noodle interface 30c.

Noodles inside a skin-stringer assembly are inherently subjected to many stresses and strains. For example, the spring-back effect in manufacturing process and in-service temperature variation cause adhesive voids, radius waviness, noodle anomalies and noodle corner skin ply waviness in the curved composite laminate structures.

Figure 2:
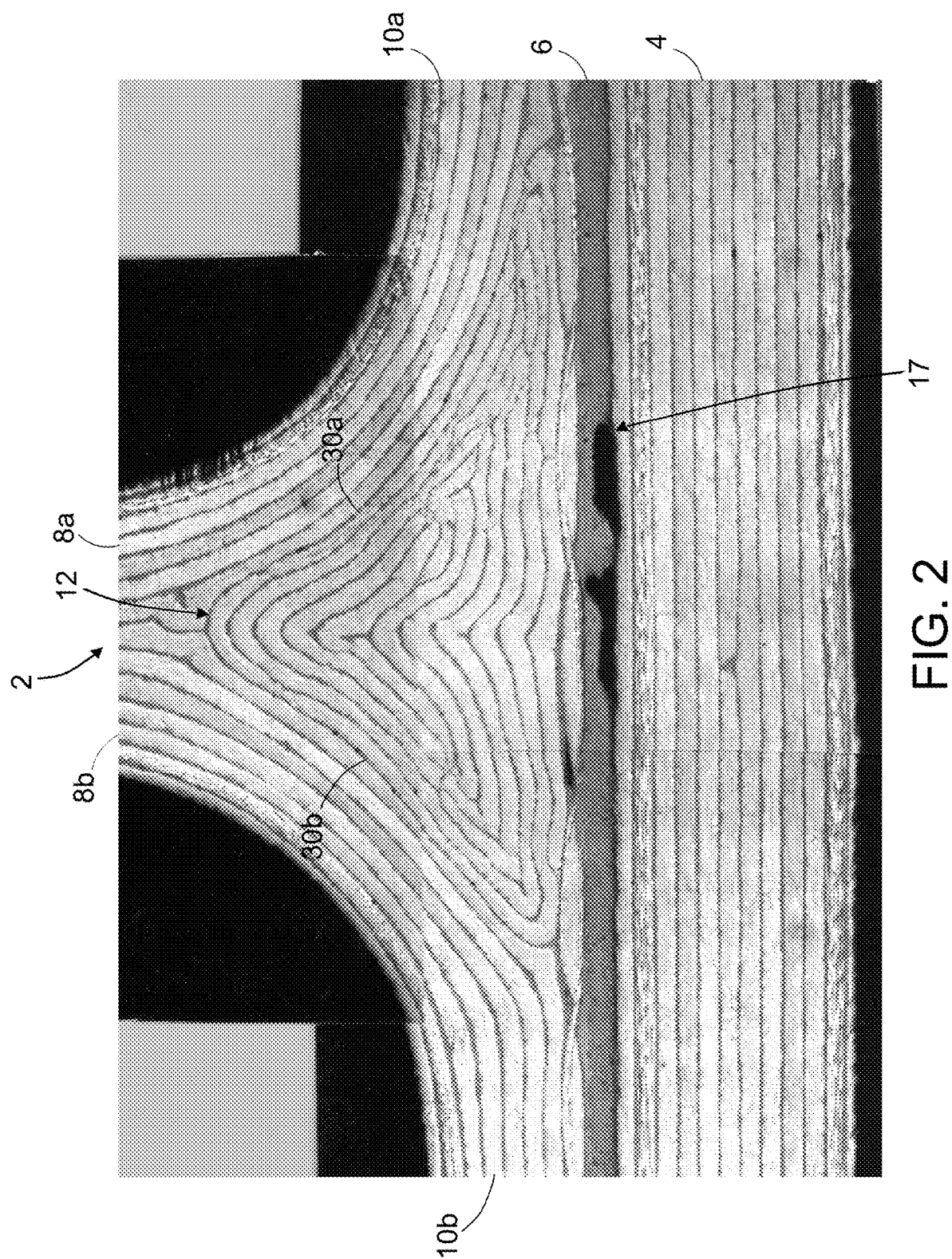
FIG. 2 is a diagram representing a cross-sectional view of an adhesively bonded skin-stringer composite structure having an anomaly in the form of a disbond in the noodle area.

FIG. 2 is a diagram representing a cross-sectional view of a stringer 2 having a disbond 17 of the adhesive layer 16 that bonds the noodle 12 to the skin 4. The inspection techniques proposed herein may be used to detect the disbond 17 and then determine its location and size. Similarly, the inspection techniques proposed herein enable the detection of disbonds present along the curved radius/noodle interfaces 30a and 30b and other anomalies in the noodle area.

Figure 3:
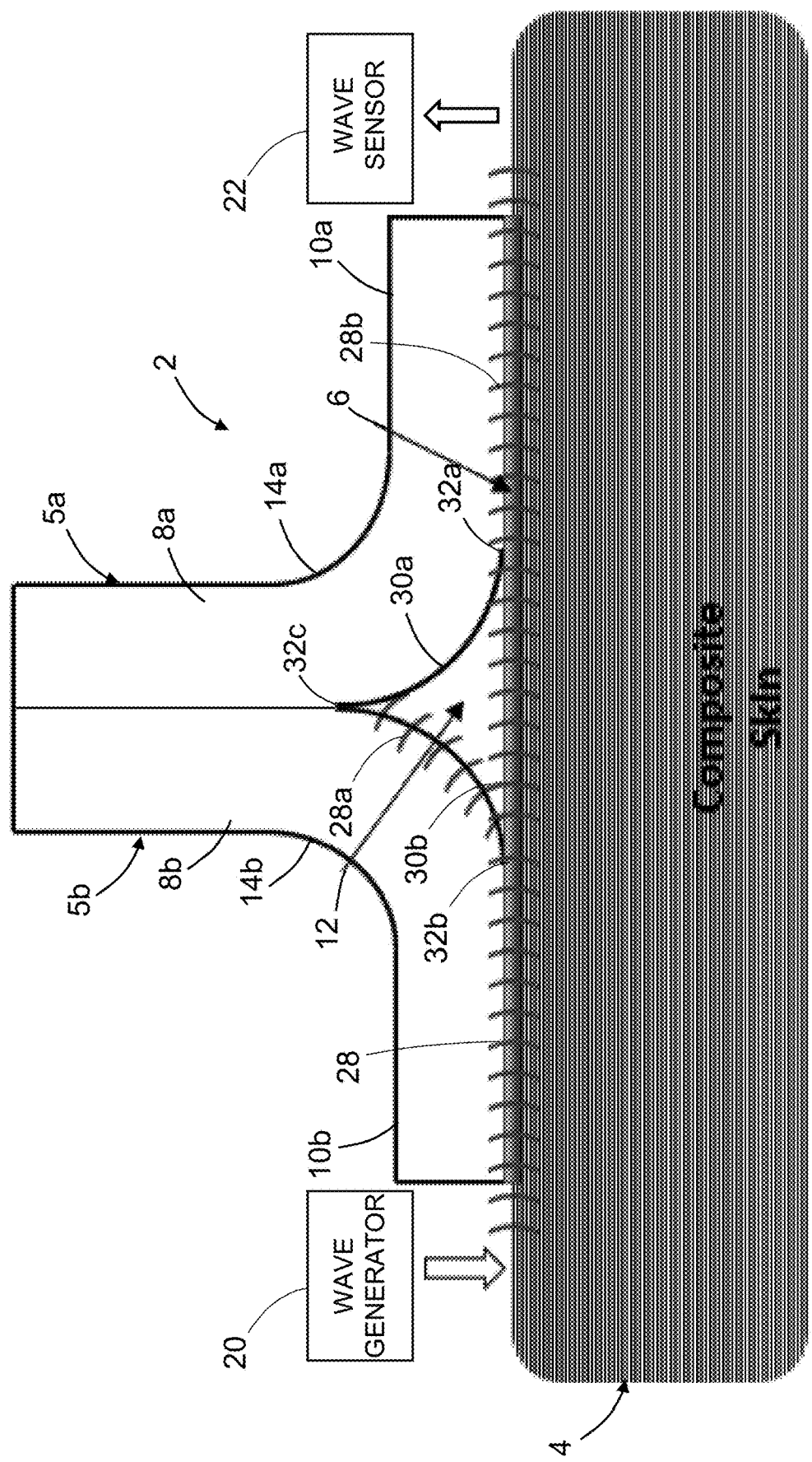
FIG. 3 is a diagram representing an adhesively bonded skin-stringer composite structure that can be simulated using the methods disclosed herein. In particular, the diagram shows an ultrasonic wave generator and an ultrasonic wave sensor acoustically coupled (indicated by arrows) to a skin on opposite sides of a stringer for the purpose of nondestructively inspecting a noodle area using guided waves.

FIG. 3 is a diagram representing an adhesively bonded skin-stringer composite structure that can be simulated using the methods disclosed herein. In particular, the diagram shows an ultrasonic wave generator 20 and an ultrasonic wave sensor 22 acoustically coupled to a surface of the skin 4 on opposite sides of the stringer 2 for the purpose of non-destructively inspecting the noodle 12 using guided waves. In addition, FIG. 3 depicts guided waves 28 propagating along an interface between a skin 4 and a stringer flange 10b and then dividing at a noodle edge 32b, some guided waves 28a propagating along the radius/noodle interface 30b, and other guided waves 28b propagating along the skin/noodle interface 30c (see FIG. 1). The guided waves 28 propagating from left to right along the adhesive bondline 6 are emitted by the wave generator 20 (e.g., an ultrasonic transducer). When the rightward-propagating guided waves 28 impinge at the noodle edge 32b, the guided waves divide into guided waves 28a and guided waves 28b. The guided waves 28b propagate further rightward along the portion of the adhesive bondline 6 that bonds the noodle 12 to the skin 4, while the guided waves 28a propagate along the radius/noodle interface 30b. The surface and guided waves in these areas encounter velocity changes, scattering and reflection that may be used to assess anomalies in the area of the noodle 12.

Rayleigh wave propagation has been demonstrated for non-dispersive, linearly elastic, isotropic, homogeneous, compressible media. Previous studies show that, in the area where the ratio of bend radius or curvature to wavelength is large, the velocity of the Rayleigh wave is the same as on a flat plate. But as the ratio of radius to wavelength decreases, the wave velocity increases]. The Rayleigh wave behavior for anisotropic composites is not very well understood due to complexity of wave behavior in these structures.

Figure 4:
FIG. 4 is a black-and-white image showing simulated guided waves propagating (at a simulated instant in time) along a simulated skin-stringer interface and around a simulated noodle in the manner partially depicted in FIG. 3.

FIG. 4 shows a black-and-white image 34 representing simulated guided waves propagating (at a simulated instant in time) along a simulated skin-stringer interface and around a simulated noodle in the manner partially depicted in FIG. 3. In accordance with one embodiment of the ultrasonic interface guided wave method for inspecting the noodle area, effective surface acoustic waves are generated to propagate on the curved surfaces of inhomogeneous composite surface. This surface wave is sensitive to the outer ply orientation of curvature and ideal for finding surface and near-surface anomalies in curved composite laminate structures. The guided waves propagate around curved surfaces, noodle edges and the adhesive layer. The surface and interface waves in these areas encounter velocity changes, scattering and reflection that has been used for assessment of defects for several locations around the noodle A finite element numerical modeling was used to study the behavior of ultrasonic guided wave in curved laminate composite structures having a noodle. Then in a damage modeling phase, several types of anomalies typically found in the noodle area inside a curved laminate composite structure were simulated to investigate the damage detection capability for the development of a non-destructive method and health monitoring system.

The simulation of guided waves on the curved surface of an anisotropic composite laminate requires powerful computation tools to model the transient explicit dynamic nature of guided wave behavior at distorted mesh elements of curvature at the noodle. FEA code was used for the simulation of guided waves. The finite element model was constructed with the capability of changing curvature in geometry and excitation frequency in the pre-processing step. The hyperbolic triangle noodle section was constructed from a unidirectional composite in which fibers are perpendicular to the plane of the paper as seen in FIG. 1. The composite model was constructed from carbon fiber-reinforced polymer (CFRP) with the following mechanical properties: longitudinal tensile modulus $E_1$=137.90 GPa; transverse tensile modulus $E_2$=10.34 GPa; shear modulus $G_{12}$=6.89 GPa; density $\rho$=1.55 g/cm$^3$; and Poisson's ratio $v$=0.34.

The curvature k=1/R varies with the radius of 9.5 mm to 19 mm. A sinusoidal pulse excitation spectrum from frequency of 1 MHz to 10 MHz was also generated by the simulated wave generator, close to the simulated bondline and noodle.

Several models have been analyzed within the foregoing frequency range and with varying curvatures. The intention of these numerical experiments was to select the optimized, most effective guided wave that can follow the curvature profile of the adhesive bond between the bended section 5a or 5b and the noodle 12 and also penetrate deep enough to reach into the noodle area for damage detection purposes.

The excitation of the guided wave was within the lower limit of 1 MHz and upper limit of 10 MHz in this simulation. The simulation results suggest the guided wave with higher frequency is associated with more effective wave form which does not separate from the curvature of the structure.

Figure 5:
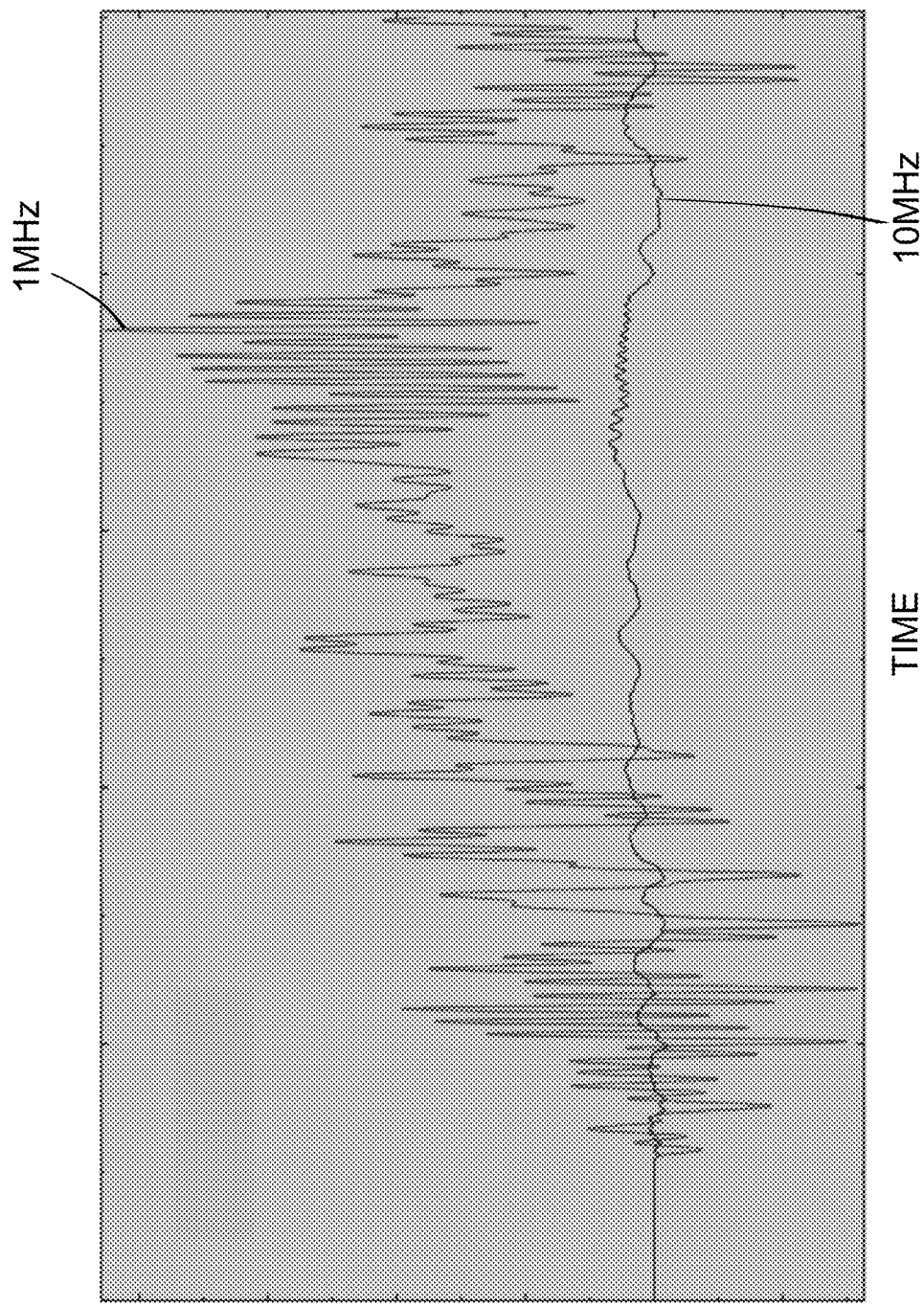
FIG. 5 is a displacement-time graph showing the displacement magnitude variation of two waveforms having respective frequencies of 1 MHz and 10 MHz in the time domain of a finite element model.
Figure 6A:
FIGS. 6A through 6E are black-and-white images showing simulated guided waves propagating (at successive simulated instants in time) along a simulated skin-stringer interface and around a simulated noodle in the manner partially depicted in FIG. 3.
Figure 6B:
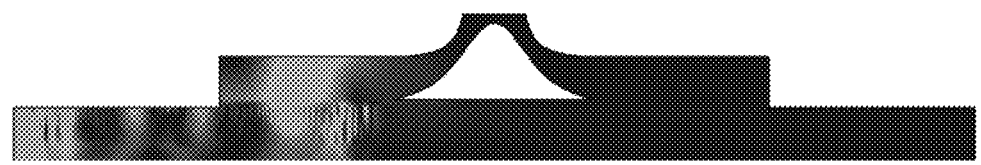
Figure 6C:
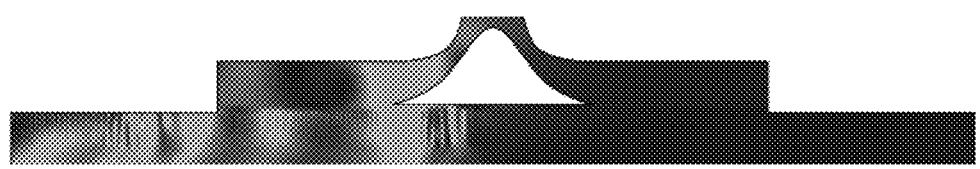
Figure 6D:
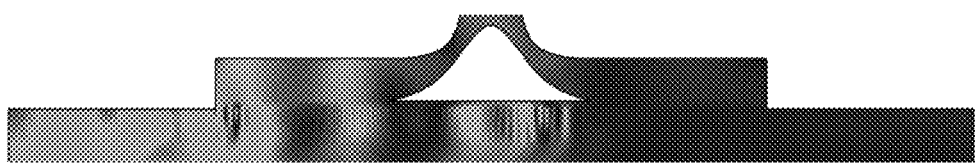
Figure 6E:
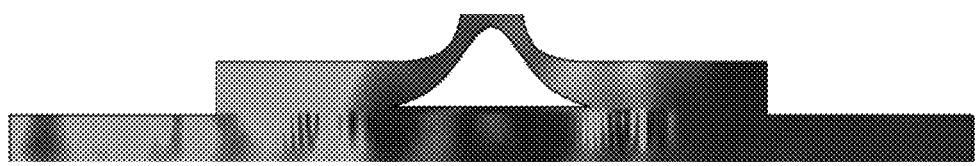

The graph in FIG. 5 shows the displacement magnitude variation of these two waveforms with excitation frequencies of 1 MHz and 10 MHz respectively in the time domain of the finite element model. As seen in FIG. 5, the wave front with higher frequency is more uniform and provides more accurate results for the analysis of wave behavior in the skin-stringer and noodle area.

As used herein, the term "disbond" refers to separation of the adhesive bondline from the inner mold line (i.e., first ply) of a composite laminate (e.g., a skin). As used herein, the term "delamination" refers to either a single or multiple interply separation within the composite laminate. Delaminations can be caused by contaminations, lack of compaction during the production and cure phase, or by the impact of an overheating of the cured material. In the bonded joints, where the adhesion strength of the bond is high, delaminations can be located in close proximity to the bondline.

In previous simulations, the disbond crack detection capability of simulated guided waves was demonstrated. The simulation results demonstrated how disconnection in the pathway of a guided wave or disbond crack size can be detected and measured by the change in parameters of the guided wave.

Additional numerical simulations were performed in an attempt to expand the same approach to a broad range of bonding problems. In reality the bonded load path is a chain of material and interfaces. The strength of the load path will be determined by the weakest link in this chain. This weak point is not usually the bondline in complex hybrid structures. Development and testing of bonded structures suggest different damage scenarios. In particular, simulations were run which enabled estimation of the guided wave parameters such as amplitude and wavelength that can produce effective waveforms for guided waves to interrogate a noodle area of a curved composite laminate structure. The information returned may be processed by a computer system configured to use that information to determine the location and nature of an anomaly embedded in the structure.

During ultrasonic inspection of composite laminate structures, usually a wave mode conversion occurs in the vicinity of an anomaly, with the scattering source at the center of the anomaly. This scattering effect results in a changed wave energy distribution that eventually causes disruption in the propagation characteristics of traveling waves. (As used herein, the term "wave energy" represents a quantity that is proportional to the sum of the absolute value of the amplitude of the wave squared at particular sampled time points.)

For a typical unidirectional composite laminate, the mechanical response and acoustic behavior of a propagating wave depend on the stacking sequence. As previously mentioned, the speed of wave propagation is sensitive to fiber orientation. In a further numerical simulation, this ply orientation dependency was investigated in further detail by examining surface and interface behavior for the laminated composite with 0-degree and 90-degree ply orientation on the surface and interface of the bonded section. The Rayleigh wave speeds propagating along the surface of our material system were determined.

For determining the effectiveness of surface and guided waves for detection of near surface and subsurface anomalies, the depth of penetration of the simulated waves into each section was verified. The wavelength of the ultrasonic wave had a significant effect on the probability of detecting a discontinuity. A general rule of thumb is that a discontinuity must be larger than one-half the wavelength to stand a reasonable chance of being detected.

The delamination numerical simulations were designed to study the behavior of a traveling guided wave along the bondline, when the size and location of delamination damage were varied. The changes in the wave amplitude, signal shape and delay in the arrival of the traveling wave along the bondline were compared with the case of an undamaged and perfectly bonded (i.e., no adhesive) baseline.

FIGS. 6A through 6E are black-and-white images showing simulated guided waves propagating (at successive simulated instants in time) along a simulated skin-stringer interface and around a simulated noodle in the manner partially depicted in FIG. 3. FIGS. 6A-6E show the gradual propagation (from left to right) of guided waves at the adhesive bondline (see adhesive bondline 6 in FIG. 1) at the skin/stringer interface. These simulation images also show the separation of the guided waves when the waves reaches the noodle area. Guided waves separate at the left edge of the noodle (see noodle edge 32b in FIG. 1) and propagate on the left and lower sides respectively of the noodle. The guided wave which is propagating along the adhesive bondline is also usable for adhesive strength assessment. Reflected waves from upper boundaries of the stringer and from the lower face of the skin reach the right edge of the noodle (see noodle edge 32a in FIG. 1), but these reflected waves are not effective waves that can be used for damage detection of the noodle region.

Noodle flaws result in expensive and time-consuming repairs. The fact that the noodle 12 (see FIG. 1) is located in an area that is not directly accessible makes it difficult to perform any reliable damage assessment. Hence the damage mode of noodles is difficult to be characterized unless the anomalies are revealed by destructive testing.

Figure 7:
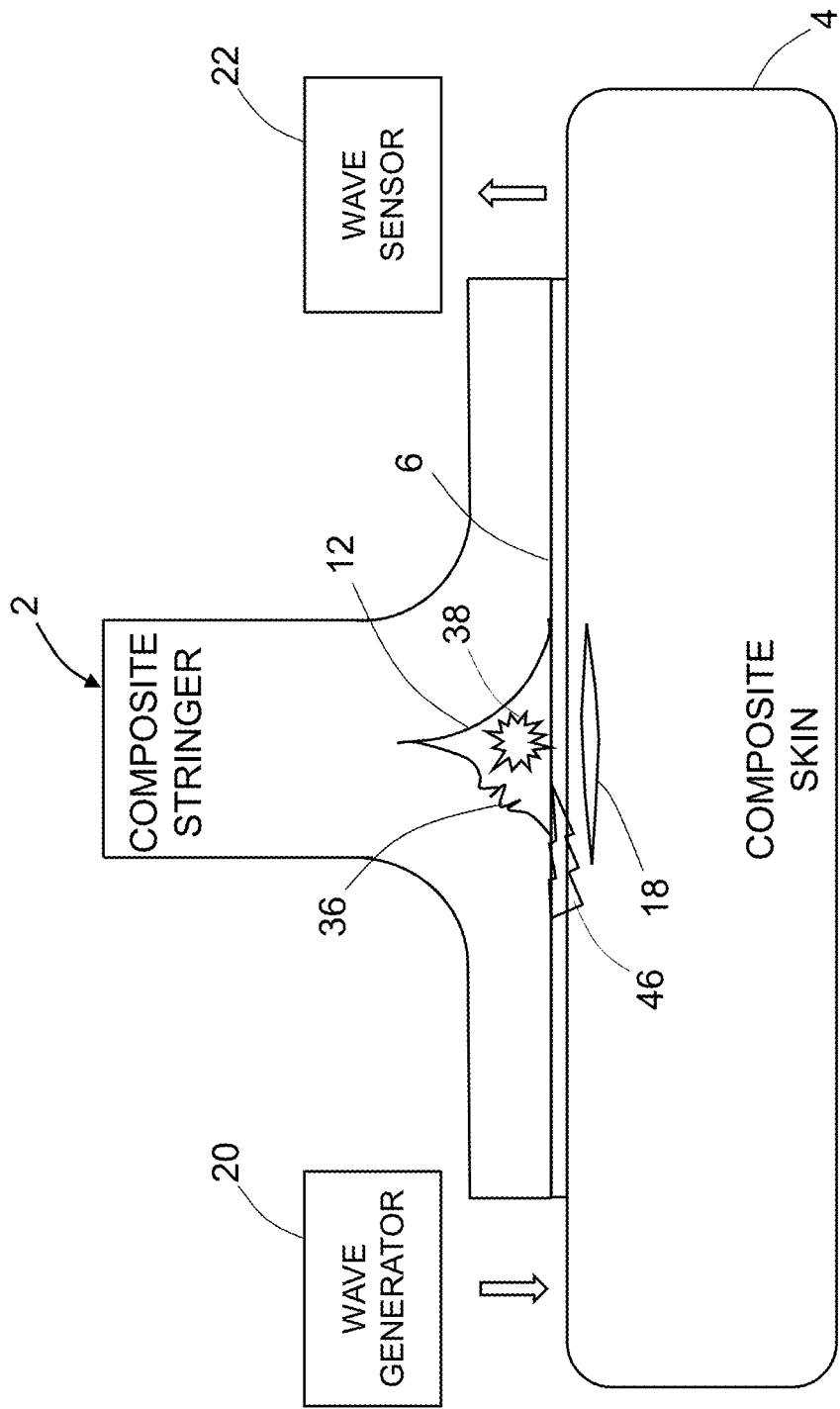
FIG. 7 is a diagram representing a side view of an adhesively bonded skin-stringer composite structure similar to that depicted in FIG. 1 with the addition of symbols representing different types of anomalies which may be found in a noodle area.

The geometry and composition of noodles suggest some anomalies form in the areas shown in FIG. 7. The typical anomalies are identified as void 38, wrinkle 36, crack (disbond) 46 and delamination 18. Voids usually form due to imperfect processing of composites in manufacturing; voids create a vacuum in the noodle region which induces significant reduction in stiffness. Depending on the distance of the void 38 from the boundaries of the noodle 12, it may or may not be possible for the guided wave to detect the void effectively. Moreover the configuration of wave generator 20 and wave sensor 22 is challenging to identify the void 38 in the noodle 12. Fiber waviness or matrix enrichment in the curved area of composites are common anomalies which are known as wrinkles. Guided waves are very sensitive to the presence of a wrinkle 36 because the wrinkle 36 changes the direction and path of the traveling wave. However, modeling wrinkles in simulation and verification in a test experiment is challenging.

Disbonds (cracks) and delaminations, initiating on the edges and sides of the noodle 12, are the most frequent types of anomaly which can be modeled and studied using the method disclosed herein. One simulation placed a disbond crack 46 at the left edge 32b of the noodle 12 (see FIG. 7). Another simulation placed a delamination 18 near the skin/noodle interface. Wave displacement profiles were acquired. There are other possibilities for detecting anomalies in the noodle area using guided waves depending on the location with respect to the propagating wave on the bondline and interface.

One research study was devoted to assess the ability to detect anomalies of different sizes in a radius filler or noodle in a curved composite laminate structure. Noodles are inherently associated with multiple damage forms and sizes which are typically hidden from typical inspection methods such as non-destructive evaluation. The work performed in the research study suggests that guided waves may be effectively used for inspection of noodles. Some damage scenarios were modeled by finite element modeling and the results may be used for development of structural health monitoring system for detection and assessment of anomalies in composite noodles.

A comparative study of a simulated undamaged noodle with noodles having disbonds with different crack lengths was performed. More specifically, a simulated curved composite laminate structure having an undamaged noodle (model UD) and other simulated curved composite laminate structures having noodles with cracks of varying length (models D1-D5) were constructed by finite element modeling. The simulated cracks having lengths varying from 0.1 inch to 0.5 inch were located along the noodle/skin interface near the noodle edge 32b (see FIG. 1).

The times of flight (TOF) (in microseconds) for the six different models are listed in Table 1. As is evident from Table 1, the velocity of the guided wave decreased as the crack length increased. In the case of a void inside and a wrinkle on the side of a noodle, the change in the value of the guided wave parameter is not linear, as is the case for disbond and delamination.

TABLE 1

| Model Name | Damage Crack Size (mm) | TOF (μs) |
| --- | --- | --- |
| UD | 0 | 10.48 |
| D1 | 2.54 | 11.33 |
| D2 | 5.08 | 11.85 |
| D3 | 7.62 | 12.65 |
| D4 | 10.16 | 13.69 |
| D5 | 12.7 | 13.88 |

Figure 8A:
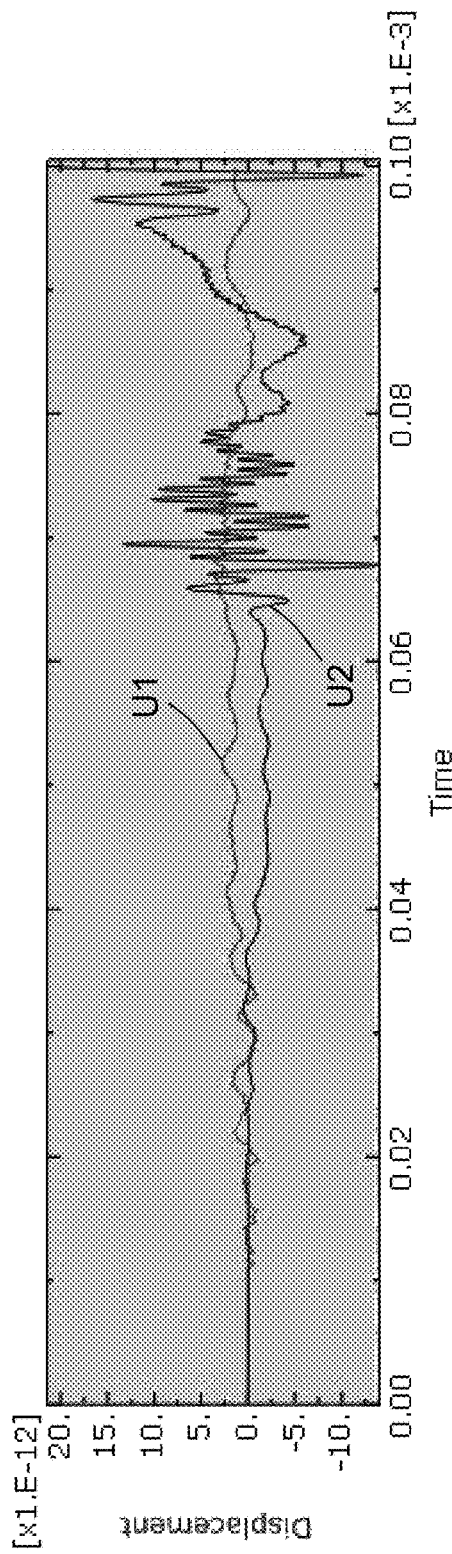
Figure 8B:
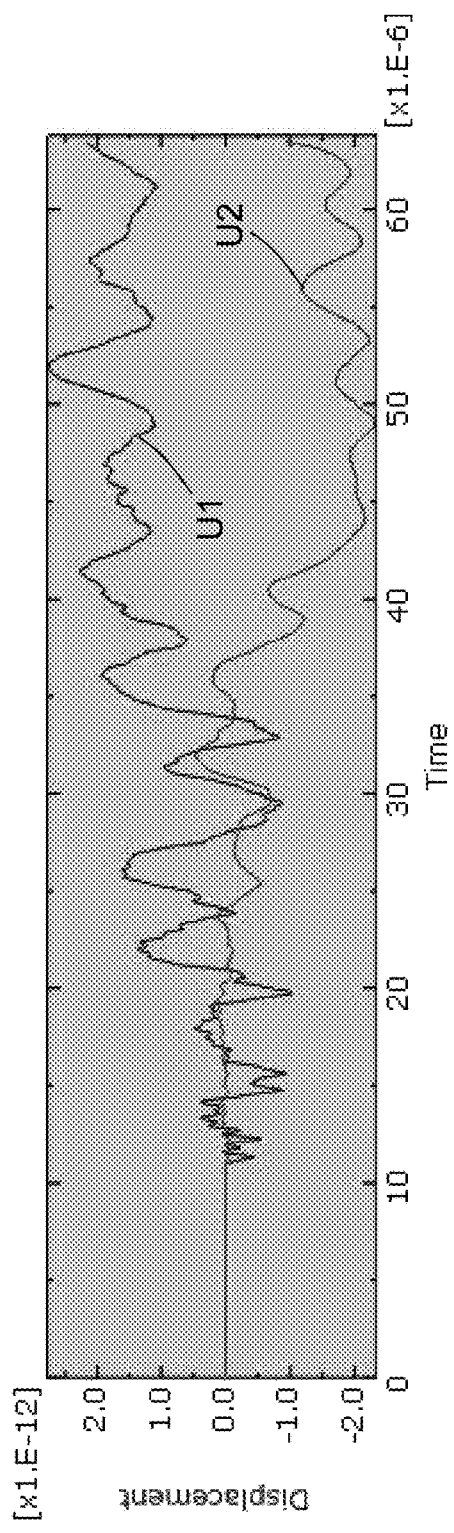
Figure 8E:
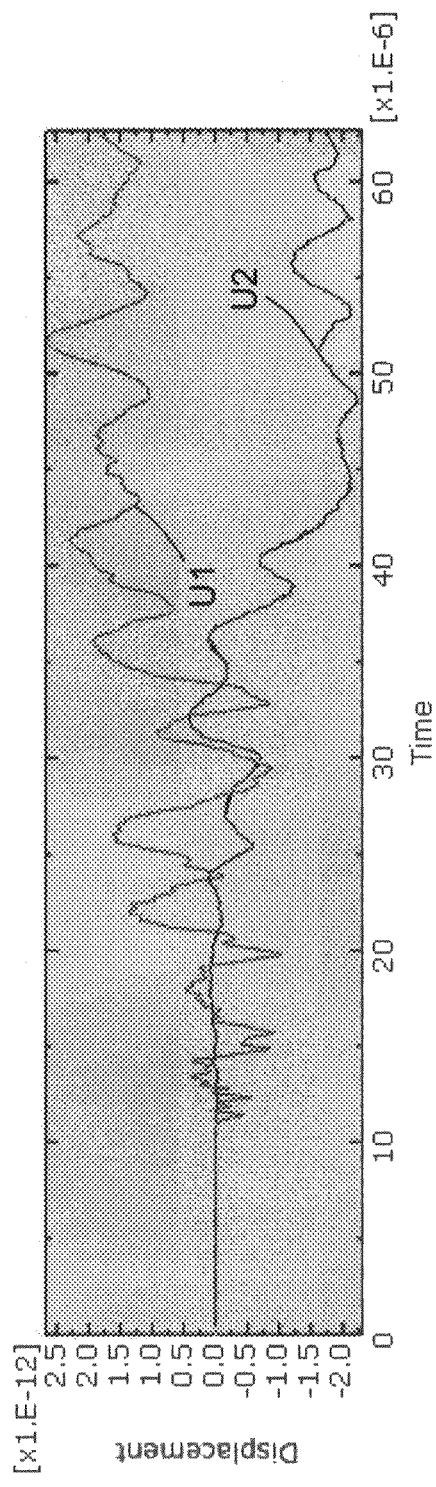
Figure 8F:
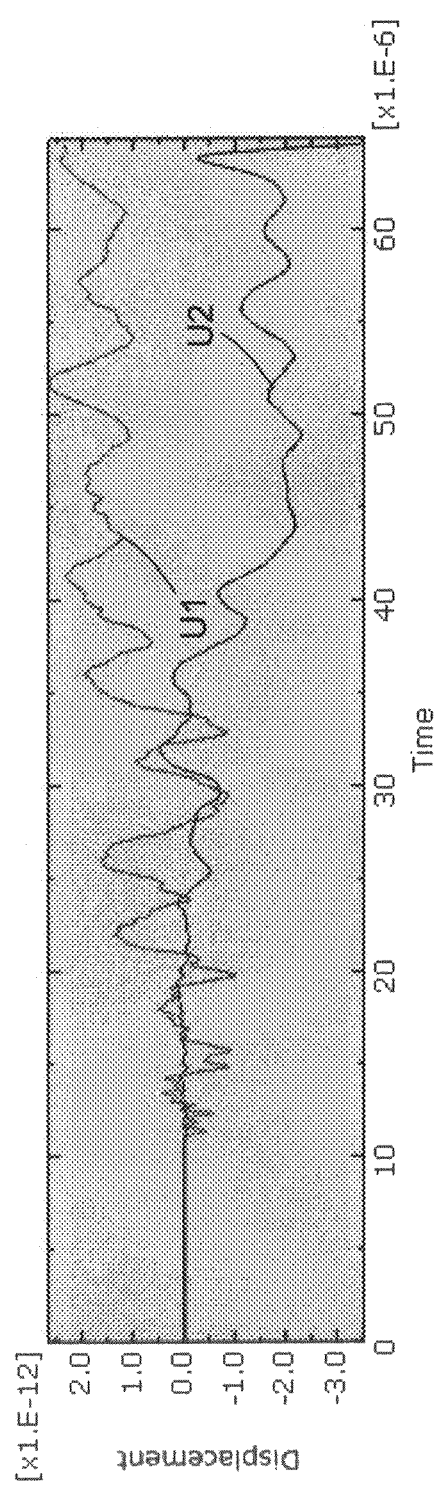

FIGS. 8A through 8F are displacement-time graphs showing the magnitudes of displacement U1 in the X direction and displacement U2 in the Y direction in the time domain for the six different finite element models: undamaged (FIG. 8A); 2.54-mm crack (FIG. 8B); 5.08-mm crack (FIG. 8C); 7.62-mm crack (FIG. 8D); 10.16-mm crack (FIG. 8E); and 12.7-mm crack in noodle (FIG. 8F). The time of flight (TOF), which is the duration of time for the wave front to record the displacement at a certain node of the model, can be used to assess the changes in velocity. The change in velocity may be measured based on the time of flight between the fixed two points.

In the above-described simulations, the frequency of the guided wave was selected to meet two criteria: (a) able to propagate along a curved radius/noodle interface when the guided wave enters the radius; and (b) able to penetrate deep enough to get to the damaged area. The velocity of a guided wave propagating along a curved interface may change, resulting in a change in the time of flight between two points. In addition, some reflections of the guided waves happen at the curved interface and at the noodle edge (so not only a pitch-catch method can be used for damage detection but also a pulse-echo might be used)

As the ratio of the radius of curvature R (of the curved interface) to wavelength $\lambda$ (of the guided wave) increases, the guided wave velocity gets close to what the velocity would be were the guided wave propagating along a straight interface As the ratio of the radius of curvature R to wavelength $\lambda$ decreases, the guided wave velocity increases. At a ratio of $R/\lambda=3.5$, the guided wave velocity is equal to the horizontal shear wave velocity for the specific composite material being simulated, which simulated guided wave propagates along the curvature at a simulated noodle/radius interface and penetrates deep through the thickness of the composite material in the noodle area of a simulated skin-stringer assembly.

High-frequency ($\geq 5$ MHz) guided waves interact with boundaries (e.g., interfaces) in a special way so that boundary conditions can be satisfied. The high-frequency guided waves may be generated by a piezoelectric transducer in the form of a disk. If a bulk wave were produced at a lower frequency (e.g., <200 kHz), then the ultrasonic waves in the noodle area of the skin-stringer assembly would propagate in infinite sections ("infinite" meaning that the boundaries have no influence on wave propagation). In contrast, ultrasonic guided waves deflected by boundaries during propagation and the condition of the boundary (e.g., interface) determines the guided wave propagation behavior (e.g., how much wave energy crosses the interface). Hence the guided waves follow the boundaries formed by the skin/stringer, skin/noodle and radius/noodle interfaces. To assess the structural health of the noodle area inside a curved composite laminate structure using guided waves, the appropriate frequency range for the interface guided waves may be selected as a function of the radius of curvature of the curved interface. As the guided wave travels from a first location acoustically coupled to the wave generator 20 to a second location acoustically coupled to the wave generator 20, any anomalies in the path of the guided wave cause the wave velocity to decrease, giving rise to a corresponding increase of the time of flight.

All of the damage scenarios (disbond at free edge of noodle, delamination at noodle/skin interface, wrinkle around the noodle boundaries and noodle fracture or void) cause linear change in the time of flight with respect to the damage size and location. It is difficult to distinguish each of anomaly types by this linear analysis approach using time of flight. But there is also a nonlinear effect for each damage mode, e.g., nonlinear resonance, mixed frequency response, sub-harmonics generation, and higher harmonics generation.

Figure 9A:
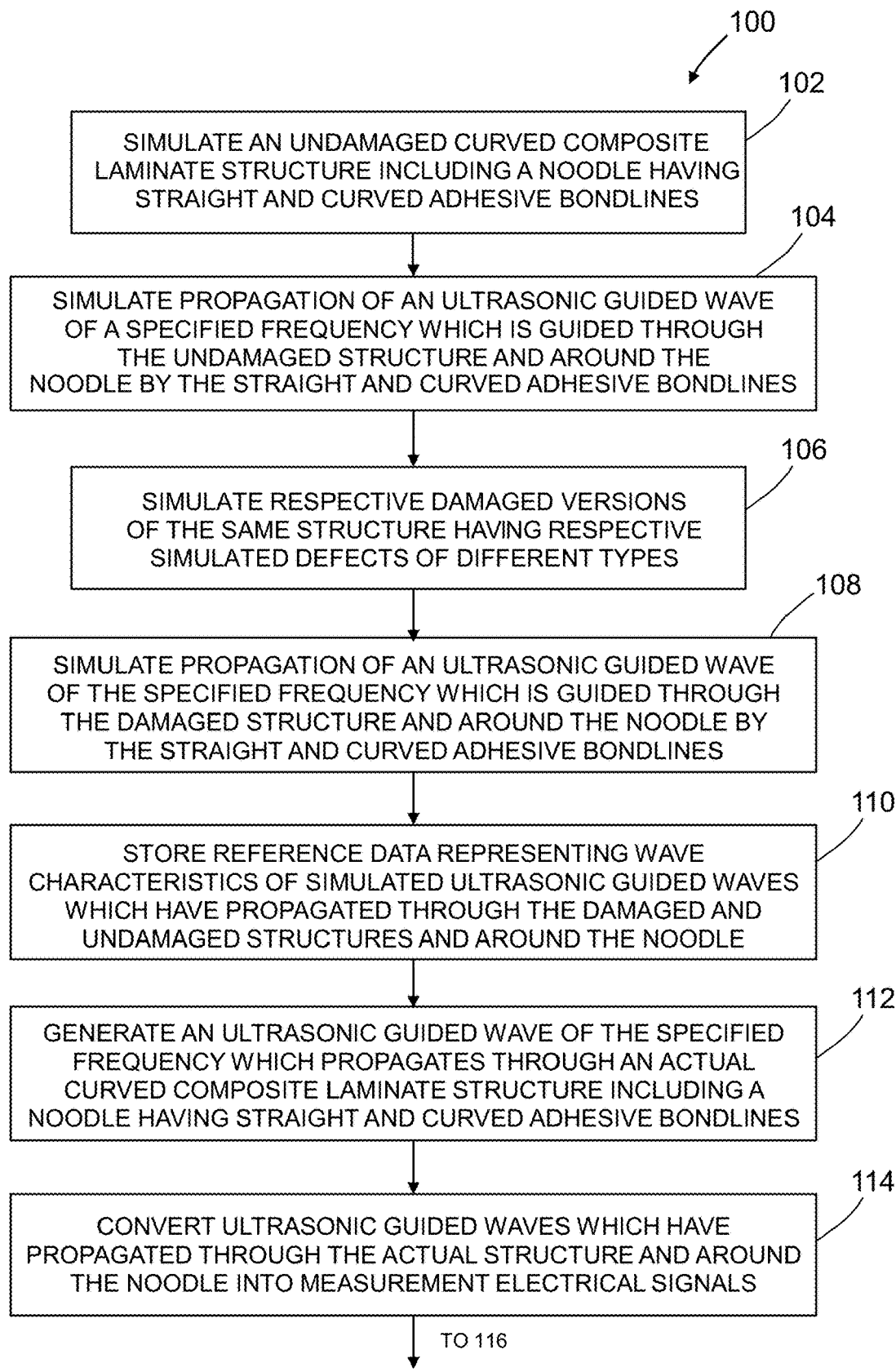
FIGS. 9A and 9B are respective portions of a flowchart identifying steps of a method for non-destructive inspection of a noodle area in an adhesively bonded skin-stringer composite structure in accordance with one embodiment.
Figure 9B:
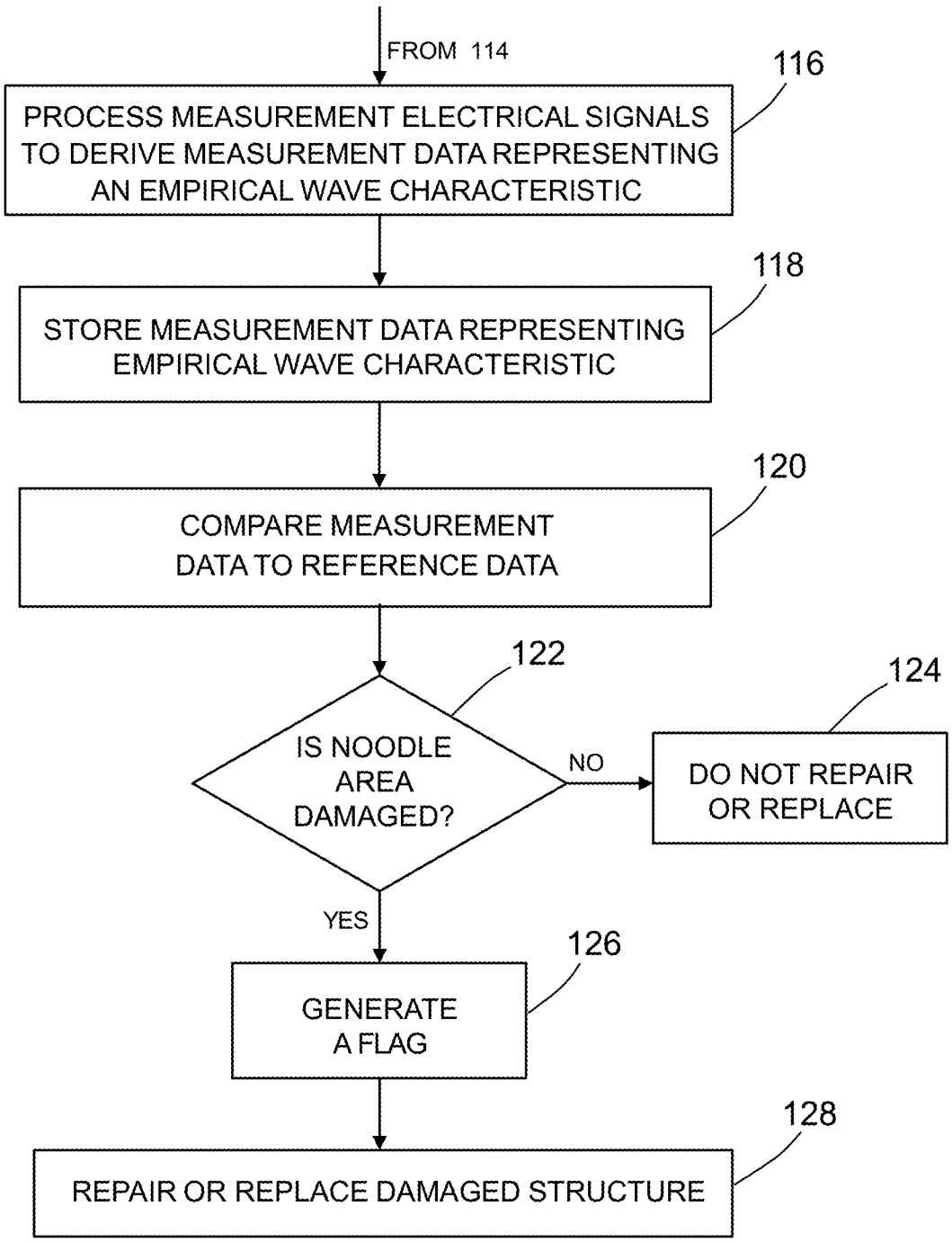

FIGS. 9A and 9B are respective portions of a flowchart identifying steps of a method 100 for structural health monitoring of adhesively bonded joints in accordance with one embodiment. Referring to FIG. 9A, the method 100 comprises the following steps: simulating an undamaged curved composite laminate structure including a noodle having straight and curved adhesive bondlines (step 102); simulating propagation of an ultrasonic guided wave of a specified frequency which is guided through the undamaged structure and around the noodle by the straight and curved adhesive bondlines (step 104); simulating respective damaged versions of the same structure having respective simulated defects of different types (step 106); simulating propagation of an ultrasonic guided wave of the specified frequency which is guided through the damaged structure and around the noodle by the straight and curved adhesive bondlines (step 108); storing reference data in a non-transitory tangible computer-readable storage medium, which reference data represents wave characteristics of simulated ultrasonic guided waves which have propagated through the damaged and undamaged structures and around the noodle and arrived at a sensing location on a surface of the simulated structure (step 110); generating an ultrasonic guided wave of the specified frequency which propagates through an actual curved composite laminate structure including a noodle having straight and curved adhesive bondlines, wherein the actual curved composite laminate structure has material properties which are the same as or similar to material properties of the simulated curved composite laminate structure (step 112); and converting ultrasonic guided waves which have propagated through the actual curved composite laminate structure and around the noodle and arrived at a sensing location on a surface of the actual curved composite laminate structure into measurement electrical signals (step 114).

Referring to FIG. 9B, step 114 is followed by the following steps: processing the measurement electrical signals to derive measurement data representing an empirical wave characteristic (step 116); storing measurement data representing the empirical wave characteristic in the non-transitory tangible computer-readable storage medium (step 118); comparing the measurement data to the reference data (step 120); and classifying the noodle area as being damaged or not in dependence on the results of comparing the measurement data to the reference data (step 122). If a determination is made in step 122 that the noodle area is not damaged, then the actual curved composite laminate structure is neither repaired nor replaced (step 124). If a determination is made in step 122 that the noodle area is damaged, then a flag is generated (step 126) and thereafter the damaged actual curved composite laminate structure is either repaired or replaced (step 128).

In accordance with one embodiment, the numerical simulation uses the material properties and dimensions of a simulated structure that matches the structure to be inspected. For example, the simulated adhesive bondlines of the simulated structure and the adhesive bondlines of the actual structure have the same thicknesses. In addition, the generating location (i.e., the location of a simulated wave generator) on the surface of the simulated structure and the generating location (i.e., the location of wave generator 20) on the surface of the actual structure are the same. Likewise the sensing location (i.e., the location of a simulated wave sensor) on the surface of the simulated structure and the sensing location (i.e., the location of wave sensor 22) on the surface of the actual structure are the same.

The systems and methods disclosed herein use numerical simulation and modeling to study and visualize the behavior of ultrasonic wave propagation in curved composite laminate structures having a noodle. The results of these modeling techniques can be of particular interest in the development of non-destructive evaluation techniques and the optimal placement of the ultrasonic wave generator and ultrasonic wave sensor in a structural health monitoring system. In accordance with some embodiments, the numerical simulation technique uses open-source Finite Element Analysis (FEA) code, Abaqus Dynamic Explicit, which has the capability to model different damage scenarios and failure modes in a variety of structures.

A structural health monitoring system that utilizes numerical simulation with finite element modeling can reduce the cost associated with calibration of fixed or portable nondestructive testing (NDT) tools and equipment in term of adjustments for frequency, range, transducer type, and placement. The system disclosed herein also can predict the expected results from inspection by simulating the behavior of ultrasonic wave propagation in curved composite laminate structures, as well as the adverse effect of any anomaly in the curved composite laminate structure. One benefit of this system is that the operator or inspector can use the simulation results and visualize the expected outcome of the inspection, before adjusting the tool and interrogating the curved composite laminate structure for inspection. Finite element modeling can also be used for verification and justification of the inspection method and ultimately enables a change from a schedule-based maintenance concept to a condition-based maintenance approach.

Figure 10:
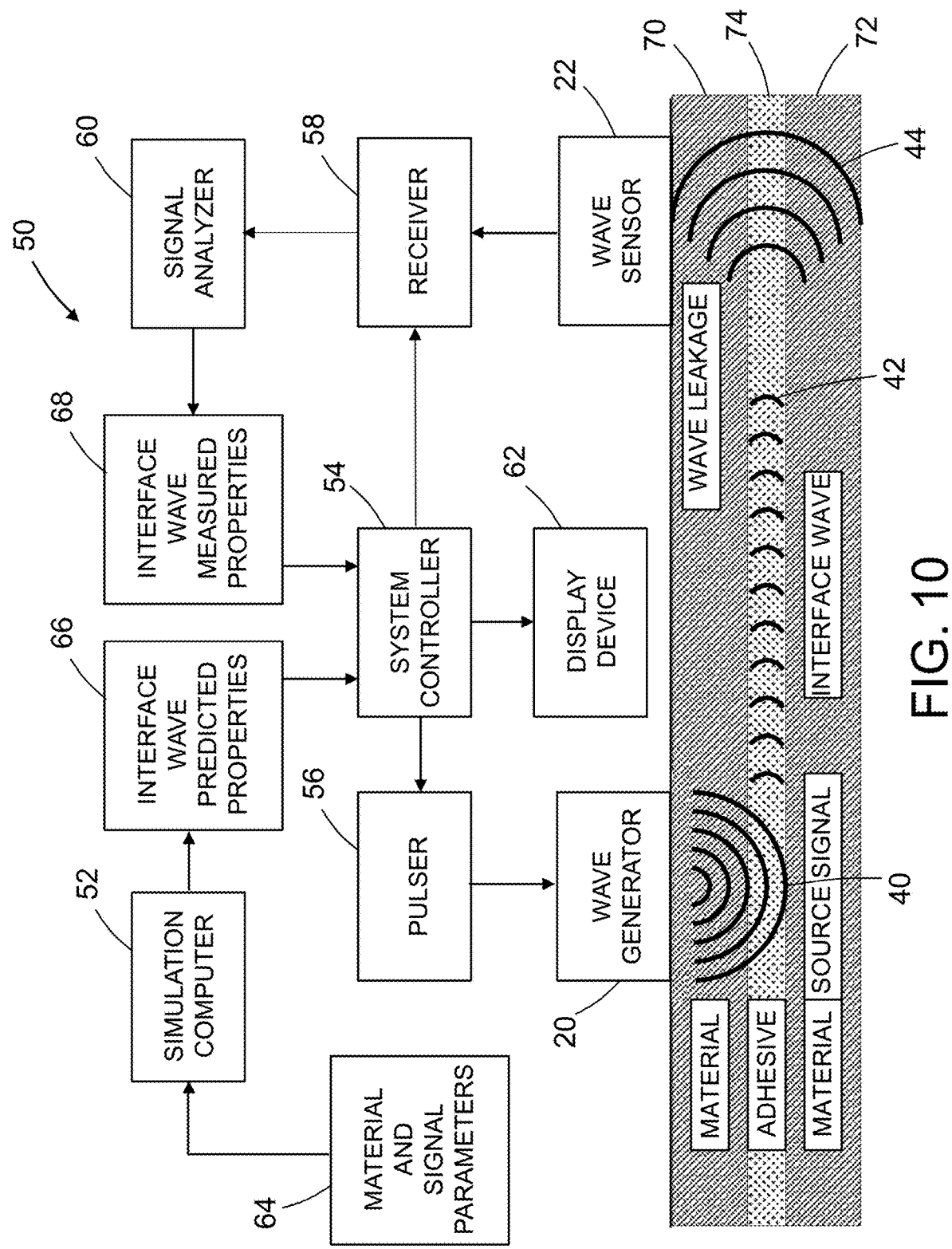
FIG. 10 is a block diagram identifying some components of a structural health monitoring system in accordance with one embodiment.

FIG. 10 is a block diagram identifying some components of a structural health monitoring system 50 in accordance with one embodiment. The structural health monitoring system 50 includes a wave generator 20 and a wave sensor 22, both of which are shown acoustically coupled (at different locations) to a first composite laminate 70 adhesively bonded to a second composite laminate 72 by a layer of adhesive 74. In the scenario depicted in FIG. 10, the structural health monitoring system 50 is inspecting a composite structure that does not have bended sections or a noodle. However, the structural health monitoring system 50 (represented symbolically in FIG. 10) may also be employed to monitor curved composite laminate structures of the type shown in FIG. 1, in which case the wave generator 20 and wave sensor 22 would be located on a skin 4 on opposite sides of a stringer 2 as seen in FIGS. 3 and 7.

In the particular configuration depicted in FIG. 10, there are at least three computer systems, namely, simulation computer 52, system controller 54 and signal analyzer 60. As used in the claims, the term "computing system" comprises one or more of the following: a computer, a processor, a controller, a central processing unit, a microcontroller, a reduced instruction set computer processor, an application-specific integrated circuit, a programmable logic circuit, a field-programmable gate array, a digital signal processor, and/or any other circuit or processing device capable of executing the functions described herein. For example, a computing system may comprise multiple microcontrollers or multiple processors which communicate via a network or bus. As used herein, the terms "computer" and "processor" both refer to devices having a processing unit (e.g., a central processing unit) and some form of memory (i.e., computer-readable medium) for storing a program which is readable by the processing unit.

The simulation computer 52 is configured with material and signal parameters 64 for simulating guided wave propagation along an adhesively bonded joint. The results of such numerical simulations are guided wave predicted properties 66. The guided wave predicted properties 66 are transmitted in the form of digital reference data to the system controller 54, along with the signal parameters used in the simulation.

Figure 11:
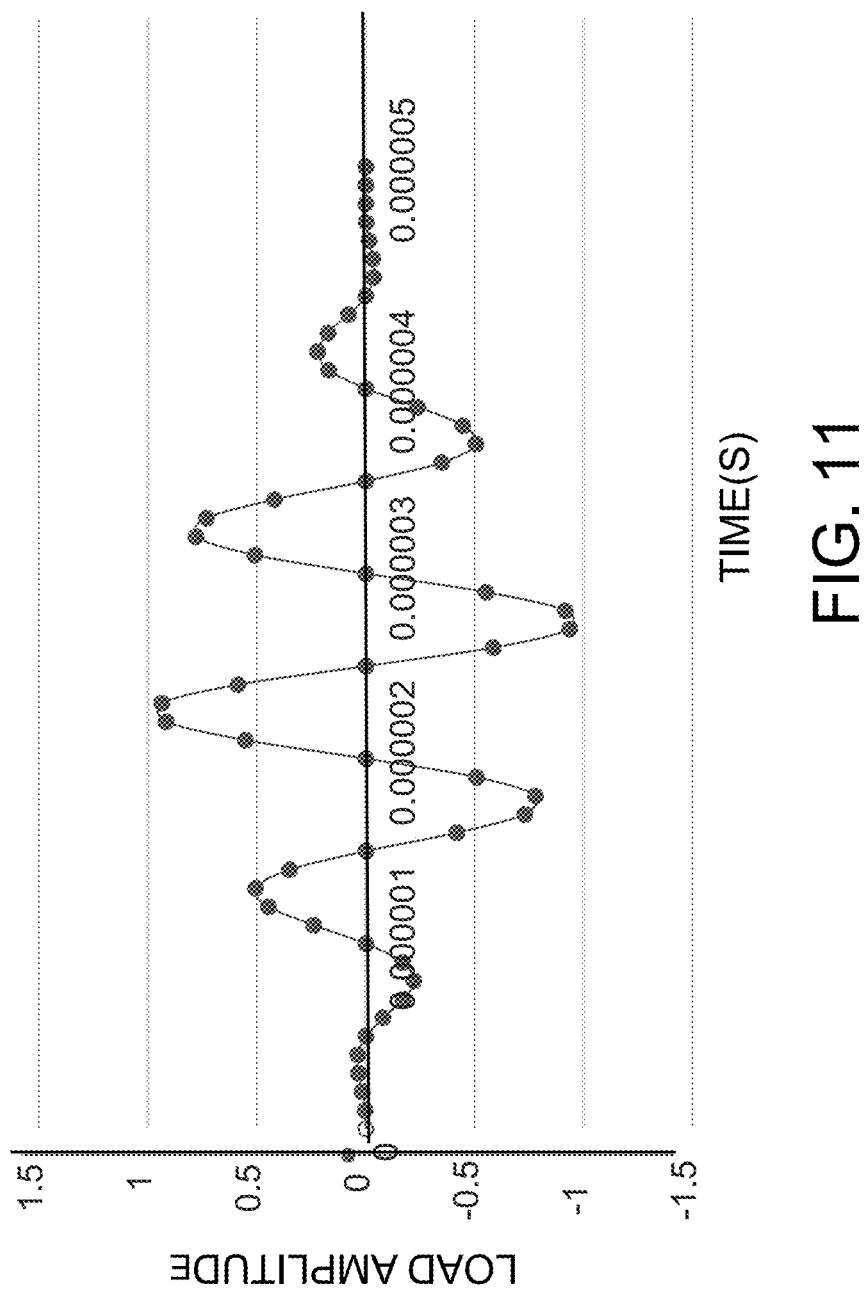
FIG. 11 is a graph showing a Hanning-windowed, five-cycle burst of a sinusoidal signal used as a pulse excitation signal at an ultrasonic signal generator.

The system controller 54 is configured to send electrical control signals to a pulser 56, which electrical control signals instruct the pulser 56 regarding the pulsing scheme to be employed. In response to those control signals, the pulser 56 outputs electrical signals representing the waveform of the ultrasonic waves to be generated by the wave generator 20. The wave generator 20 may comprise one or more ultrasonic transducer elements. The wave generator 20 transduces the electrical signals from pulser 56 into ultrasonic waves. More specifically, the electrical signals sent to the pulser 56 are configured to cause the pulser 56 to generate a burst of ultrasonic waves having wave characteristics which are the same or similar to the wave characteristics of the simulated ultrasonic waves used in the simulation. For example, the wave generator 20 may be excited using the Hanning-windowed, five-cycle burst of a sinusoidal signal depicted in FIG. 11.

In the inspection scenario depicted in FIG. 10, the wave generator 20 is acoustically coupled to a surface of a first composite laminate 70 that is bonded to a second composite laminate 72 by a layer of adhesive 74. The wave generator 20 is activated to generate ultrasonic waves 40 that propagate through the material of the first composite laminate 70 and into the layer of adhesive 74. A portion of the wave energy entering the first composite laminate 70 becomes interface guided waves 42 which are guided by the composite-adhesive interface to propagate in the layer of adhesive 74 along a line connecting the location of wave generator 20 to the location of wave sensor 22.

The wave sensor 22 is also acoustically coupled to the surface of the first composite laminate 70, but at a different location. The wave sensor 22 may comprise one or more ultrasonic transducer elements. The distance traveled by a guided wave 42 (similar to guided wave 28 in FIG. 3) as it propagates from the wave generator 20 to the wave sensor 22 and the time of flight associated with that distance can be used to calculate the velocity of the interface guided wave 42, which velocity may vary in dependence of the state of health of adhesive 74. Some of the wave energy propagating along the adhesive 74 leaks out of the waveguide in the form of propagated ultrasonic waves 44, which can be detected by the wave sensor 22.

As previously noted, the structural health monitoring system 50 may also be used to inspect a composite structure having bended sections and a noodle of the type depicted in FIGS. 3 and 7. In accordance with the nondestructive inspection scenario depicted in FIGS. 3 and 7, the wave generator 20 is acoustically coupled to a surface of the skin 4 at the location depicted in FIGS. 3 and 7, generating both surface waves that propagate leftward along the surface of the skin 4 and interface guided waves that propagate rightward along the portion of the adhesive bondline 6 between the skin 4 and the flange 10b. The interface guided waves then divide at the noodle edge 32b as previously described.

The wave sensor 22 converts impinging ultrasonic waves into electrical signals which are sent to a receiver 58. The receiver 58 receives electrical signals from the system controller 54 representing the pulse burst transmitted by the wave generator 20. The receiver in turn outputs electrical signals representing the acquired ultrasonic inspection data to the signal analyzer 60.

The signal analyzer 60 is a computer system configured to analyze the acquired ultrasonic inspection data and calculate guided wave measured properties 68. The guided wave measured properties 68 preferably comprise one or more of the following wave characteristics of the ultrasonic waves that propagate from wave generator 20 to wave sensor 22: time of travel, change in amplitude, change in phase and change in wave energy distribution. The guided wave measured properties 68 are transmitted in the form of digital measurement data to the system controller 54. The system controller 54 is further configured to: (1) compare the measurement data (i.e., guided wave measured properties) to the reference data (i.e., guided wave predicted properties); (2) classify the noodle area as being damaged or not in dependence on the results of comparing the measurement data to the reference data; and (3) generate a flag in response to the noodle area being classified as damaged. The flag may be any one of the following: an analog signal, a digital code, a report, a notice, an alert or a warning. The flag may be displayed on a display device 62. In the alternative, the flag may take the form of an aural alert.

Figure 12:
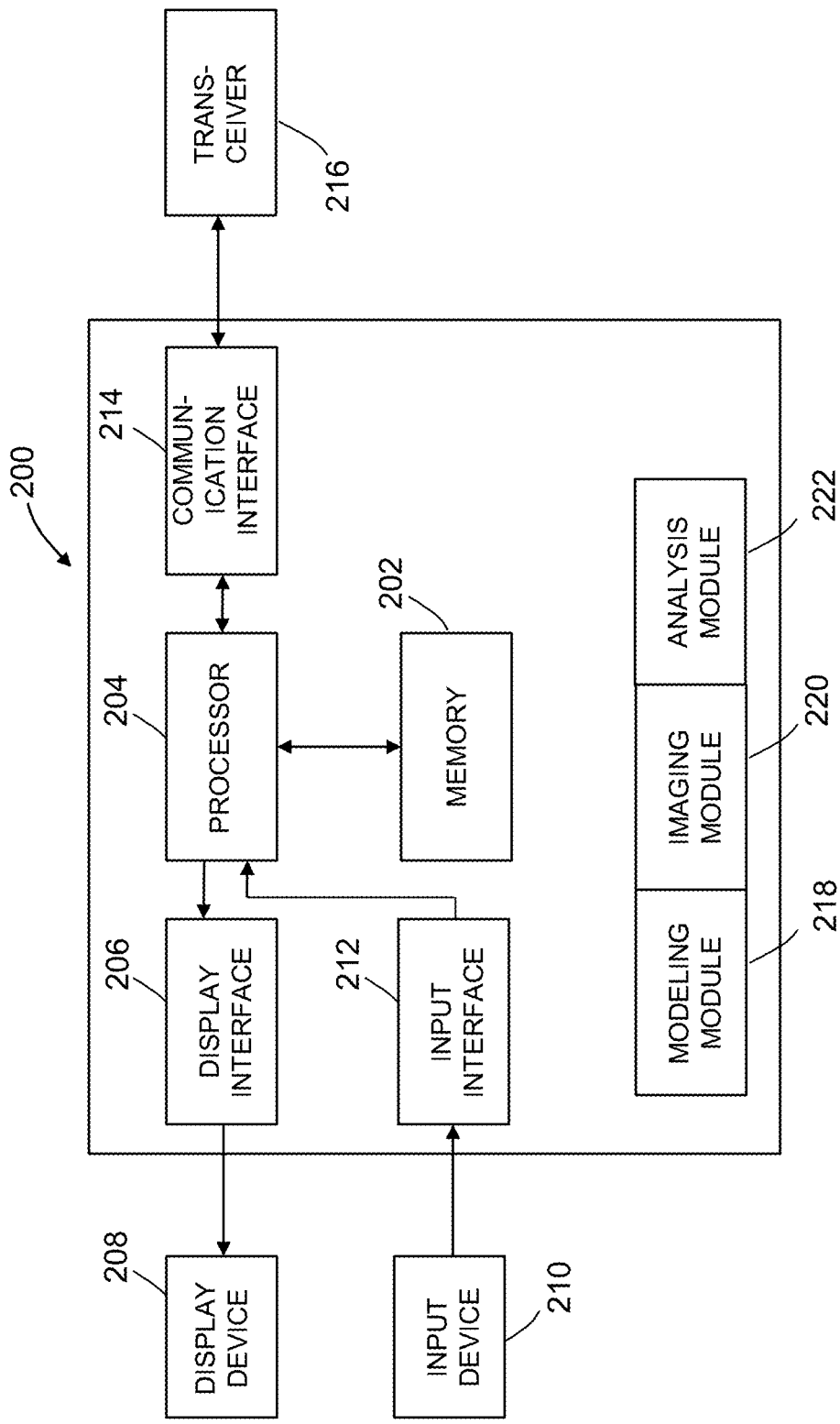
FIG. 12 is a block diagram identifying components of a computer system suitable for executing automated data processing functions that simulate guided wave propagation along interfaces of an adhesively bonded skin-stringer composite structure having a noodle.

FIG. 12 is a block diagram identifying components of a computer system 200 suitable for executing automated data processing functions that simulate wave propagation along adhesively bonded joints in a structure. In accordance with one embodiment, computer system 200 comprises a memory device 202 (e.g., a non-transitory tangible computer-readable storage medium) and a processor 204 coupled to memory device 202 for use in executing instructions. More specifically, computer system 200 is configurable to perform one or more operations described herein by programming memory device 202 and/or processor 204. For example, processor 204 may be programmed by encoding an operation as one or more executable instructions and by providing the executable instructions in memory device 202.

Processor 204 may include one or more processing units (e.g., in a multi-core configuration). As used herein, the term "processor" is not limited to integrated circuits referred to in the art as a computer, but rather broadly refers to a controller, a microcontroller, a microcomputer, a programmable logic controller, an application specific integrated circuit, and other programmable circuits.

In the exemplary embodiment, memory device 202 includes one or more devices (not shown) that enable information such as executable instructions and/or other data to be selectively stored and retrieved. In the exemplary embodiment, such data may include, but is not limited to, material properties of metallic and composite materials, characteristics of ultrasonic waves, modeling data, imaging data, calibration curves, operational data, and/or control algorithms. In the exemplary embodiment, computer system 200 is configured to automatically implement a parametric finite element analysis to determine a desired evaluation setting for use in inspecting a noodle area inside an adhesively bonded curved composite laminate structure. Alternatively, computer system 200 may use any algorithm and/or method that enables the methods and systems to function as described herein. Memory device 202 may also include one or more non-transitory tangible computer-readable storage media, such as, without limitation, dynamic random access memory, static random access memory, a solid state disk, and/or a hard disk.

In the exemplary embodiment, computer system 200 further comprises a display interface 206 that is coupled to processor 204 for use in presenting information to a user. For example, display interface 206 may include a display adapter (not shown) that may couple to a display device 208, such as, without limitation, a cathode ray tube, a liquid crystal display, a light-emitting diode (LED) display, an organic LED display, an "electronic ink" display, and/or a printer.

Computer system 200, in the exemplary embodiment, further comprises an input interface 212 for receiving input from the user. For example, in the exemplary embodiment, input interface 212 receives information from an input device 210 suitable for use with the methods described herein. Input interface 212 is coupled to processor 204 and to input device 210, which may include, for example, a joystick, a keyboard, a pointing device, a mouse, a stylus, a touch sensitive panel (e.g., a touch pad or a touch screen), and/or a position detector.

In the exemplary embodiment, computer system 200 further comprises a communication interface 214 that is coupled to processor 204. In the exemplary embodiment, communication interface 214 communicates with at least one remote device, e.g., a transceiver 216. For example, communication interface 214 may use, without limitation, a wired network adapter, a wireless network adapter, and/or a mobile telecommunications adapter. A network (not shown) used to couple computer system 200 to the remote device may include, without limitation, the Internet, a local area network (LAN), a wide area network, a wireless LAN, a mesh network, and/or a virtual private network or other suitable communication means.

In the exemplary embodiment, computer system 200 further comprises at least a modeling module 218, an imaging module 220, and an analysis module 222 that enable at least some of the methods and systems to function as described herein. These modules may take the form of software comprising code executed by the processor 204. In the exemplary embodiment, modeling module 218 is configured to generate finite element models of a hybrid structure comprising an adhesively bonded joint; imaging module 220 is configured to produce and process images such as micrographs and B-scan images; and analysis module 222 is configured to perform a FEM failure analysis of the finite element model by applying boundary conditions and loads.

Finite element analysis is the practice of simulating an object using similarly shaped elements. A finite element model is composed of volumetric elements, such as tetrahedra, each having associated parameters and equations of motion. A group of elements and their parameters are used to describe a system of equations to be solved. In the present application, the finite element model may include data indicating the presence of one or more disbond cracks, delaminations, adhesive failures, adhesive degradation, adhesive cracks, cohesive failures, etc. in the adhesively bonded joint.

After the finite element model of the adhesively bonded joint has been generated, that model is subjected to automated structural analysis, e.g., finite element model analysis. For example, the finite element model may be subjected to boundary conditions such as structural information and local geometry and loads of a structural load environment to produce a strain field, which can be analyzed. If a detected anomaly is of one of the types previously described, the finite element model analysis can be used to determine the residual strength of the adhesively bonded joint.

In some embodiments the output of the finite element model analysis may be compared to or correlated with allowed damage. The allowed damage may be developed using a damage tolerance analysis. The allowable output by the damage tolerance analysis may be input to the finite element model analysis. The comparison could take a variety of forms. For example, a scalar maximum strain value could be calculated from the analysis and compared to a single allowable strain number from a design manual, a design guide, or a table created by previous test results and statistical analysis.

With allowable damage limits established, decisions about the health of the structure can now be made based on the relative magnitude of the ultimate or limit strength of the pre-anomaly structure and the ultimate or limit strength as predicted by the post-anomaly stress analysis. In some embodiments a good/not good decision regarding the continued use of the structure or component may be made as part of the finite element model analysis. As a decision aid, a graphical representation of the acceptability of the structure, and the resulting effect on future use, may be produced and output in some embodiments.

If the results of the finite element model analysis indicate that the predicted health of the noodle area is good, e.g., has a strength parameter greater than a pre-set criterion (which is predetermined by allowables/models), such as a minimum allowable strength, the inspection is ended and the part is accepted for use as is. If the results of the finite element model analysis indicate that the predicted health of the simulated adhesively bonded joint is not good, e.g., has a strength parameter less than the pre-set criterion, then a determination is made (as part of the FEM analysis) whether such an adhesively bonded joint would be repairable to function or not.

If the curved composite laminate structure with a noodle area is predicted to be repairable to function, then a similar adhesively bonded noodle area of an actual curved composite laminate is repaired. Upon completion of the repair, the repaired structure may undergo inspection and analysis in the manner previously described.

If the curved composite laminate structure with a noodle area is predicted to be not repairable to function, then the similar adhesively bonded noodle area of an actual curved composite laminate structure is rejected for use. All inspection, image processing, modeling and analysis data and the performance prediction associated with the rejected part are saved as a function of location within the similar adhesively bonded joint in data storage for use in-service if damage occurs in the future. The data storage is a non-transitory tangible computer-readable storage medium. All curved composite laminate structure inspection data is used for analytic purposes and fed back into the tool to process changes before sub-rejectable anomalies get worse.

The numerical simulations described above were directed to the use of a structural health monitoring system to assess the quality of noodle areas in curved composite laminate structures by measuring the propagation of ultrasonic guided waves through adhesive material, guided by the physical interface between the materials and the adhesive. The guided waves that result from an ultrasonic stimulus of the bonded materials are a mixture of wave effects resulting from differences in velocity, phase, and amplitude, originating from differences in material viscosity, density, thickness, continuity, and specifically differences at the physical boundaries between materials.

While systems and methods for the structural health monitoring of curved composite laminate structures have been described with reference to various embodiments, it will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore it is intended that the claims not be limited to the particular embodiments disclosed herein.

The methods described herein may be encoded as executable instructions embodied in a non-transitory tangible computer-readable storage medium, including, without limitation, a storage device and/or a memory device. Such instructions, when executed by a processing or computing system, cause the system device to perform at least a portion of the methods described herein.

As used in the claims, the term "flag" should be construed broadly to encompass any of the following: an analog signal, a digital code, a report, a notice, an alert or a warning.

The method claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the process claims be construed to exclude any portions of two or more steps being performed concurrently or alternatingly unless the claim language explicitly states a condition that precludes such an interpretation.

The invention claimed is:

1. A method for structural health monitoring of a curved composite laminate structure comprising a noodle, the method comprising:

simulating a curved composite laminate structure consisting of a noodle having first, second and third edges, a first bended section consisting of a first web, a first flange and a first radius connecting the first web to the first flange and joined to the noodle along a first curved interface that starts at the first edge, a second bended section consisting of a second web joined to the first web, a second flange and a second radius connecting the second web to the second flange and joined to the noodle along a second curved interface that starts at the second edge, and a composite laminate joined to the first flange by a first portion of an adhesive bondline, joined to the noodle by a second portion of the adhesive bondline, and joined to the second flange by a third portion of the adhesive bondline;

simulating propagation of ultrasonic waves that travel along the first portion of the adhesive bondline of the simulated curved composite laminate structure, separate at the first edge of the noodle of the simulated curved composite laminate structure, and then travel separately along the first interface and the second portion of the adhesive bondline of the simulated curved composite laminate structure;

storing reference data in a non-transitory tangible computer-readable storage medium, which reference data represents a simulated wave characteristic of simulated ultrasonic waves that have propagated through the simulated curved composite laminate structure from a first surface area of the composite laminate disposed adjacent to the first flange to a second surface area of the composite laminate disposed adjacent to the second flange;

generating ultrasonic waves which propagate through an actual curved composite laminate structure having a noodle, first and second bended sections and a composite laminate with material properties and a construction that is the same as material properties and a construction of the simulated curved composite laminate structure;

converting ultrasonic waves which have propagated through the actual curved composite laminate structure from a first surface area of the composite laminate disposed adjacent to a first flange of the first bended section to a second surface area of the composite laminate disposed adjacent to the second flange of the second bended section into measurement electrical signals;

processing the measurement electrical signals to derive measurement data representing an empirical wave characteristic of actual ultrasonic waves that have propagated from the first surface area to the second surface area of the composite laminate of the actual curved composite laminate structure;

storing the measurement data in the non-transitory tangible computer-readable storage medium;

determining a difference between the empirical wave characteristic represented by the measurement data and the simulated wave characteristic represented by the reference data; and classifying the actual curved composite laminate structure as being anomalous or not anomalous in dependence on the difference.

2. The method as recited in claim 1, wherein a ratio of a radius of curvature of the first radius divided by a wavelength of the ultrasonic waves is approximately equal to 3.5.

3. The method as recited in claim 1, wherein the simulated curved composite laminate structure has no simulated defects, and classifying the actual curved composite laminate structure comprises classifying the actual curved composite laminate structure as being anomalous if the difference is greater than a specified threshold.

4. The method as recited in claim 1, wherein the simulated curved composite laminate structure has at least one simulated defect, and classifying the adhesive bondline comprises classifying the actual curved composite laminate structure as being anomalous if the difference is less than a specified threshold.

5. The method as recited in claim 1, wherein the noodle comprises unidirectional fiber-reinforced polymeric material.

6. The method as recited in claim 1, wherein each of the first and second interfaces has a hyperbolic profile.

7. The method as recited in claim 1, wherein the wave characteristic is time of travel of the ultrasonic waves as the ultrasonic waves propagate from the first surface area to the second surface area of the composite laminate of the actual curved composite laminate structure.

8. The method as recited in claim 7, further comprising estimating a size of an anomaly in the actual curved composite laminate structure based on a time of flight.

9. The method as recited in claim 1, wherein the wave characteristic is time of travel of the ultrasonic waves as the ultrasonic waves propagate from the first surface area of the composite laminate to the first edge of the noodle and then back to the first surface area of the composite laminate of the actual curved composite laminate structure.

10. The method as recited in claim 1, further comprising generating a flag in response to the actual curved composite laminate structure being classified as anomalous.

11. The method as recited in claim 10, further comprising repairing or replacing the actual curved composite laminate structure.

12. The method as recited in claim 1, wherein the composite laminate is a skin of a wing of an aircraft.

13. The method as recited in claim 1, wherein the first and second bended sections and the noodle are configured to form a blade stringer.

14. A method for structural health monitoring of a stringer-skin assembly, the method comprising:

simulating a stringer-skin assembly consisting of a noodle having a quasi-triangular profile, first and second bended sections having respective webs adhesively bonded together, and a skin adhesively bonded to the noodle and to respective flanges of the first and second bended sections along a simulated adhesive bondline;

simulating ultrasonic waves that propagate along the simulated adhesive bondline;

storing reference data in a non-transitory tangible computer-readable storage medium, which reference data represents a simulated wave characteristic of the simulated ultrasonic waves that propagate along the simulated adhesive bondline;

generating ultrasonic waves which propagate through an actual stringer-skin assembly consisting of a noodle, first and second bended sections and a composite laminate with material properties and a construction that is the same as material properties and a construction of the simulated stringer-skin assembly;

converting generated ultrasonic waves that have propagated along an actual adhesive bondline of the actual stringer-skin assembly into measurement electrical signals;

processing the measurement electrical signals to derive measurement data representing an empirical wave characteristic of the generated ultrasonic waves that propagated along the actual adhesive bondline;

storing the measurement data in the non-transitory tangible computer-readable storage medium;

determining a difference between the empirical wave characteristic represented by the measurement data and the simulated wave characteristic represented by the reference data; and classifying the actual skin-stringer assembly as having an anomaly or not having an anomaly in dependence on the difference.

15. The method as recited in claim 14, wherein the anomaly is a disbond along the actual adhesive bondline.

16. The method as recited in claim 14, wherein the anomaly is a delamination near the actual adhesive bondline.

17. The method as recited in claim 14, wherein a ratio of a radius of curvature of radius of the first bended section divided by a wavelength of the ultrasonic waves is approximately equal to 3.5.

18. The method as recited in claim 14, wherein the wave characteristic is time of travel of the generated ultrasonic waves as the generated ultrasonic waves propagate from a first surface area of the composite laminate adjacent to one edge of the actual adhesive bondline to a second surface area of the composite laminate adjacent to another edge of the actual adhesive bondline.

19. The method as recited in claim 18, further comprising estimating a size of an anomaly in the along or near the actual adhesive bondline based on a time of flight.

20. A method for structural health monitoring of a curved composite laminate structure comprising a noodle, the method comprising:

simulating an undamaged curved composite laminate structure including a noodle having straight and curved adhesive bondlines;

simulating propagation of an ultrasonic guided wave of a specified frequency which is guided through the undamaged structure and around the noodle by the straight and curved adhesive bondlines;

simulating respective damaged versions of the same structure having respective simulated defects of different types;

simulating propagation of an ultrasonic guided wave of the specified frequency which is guided through the damaged structure and around the noodle by the straight and curved adhesive bondlines;

storing reference data in a non-transitory tangible computer-readable storage medium, which reference data represents simulated wave characteristics of simulated ultrasonic guided waves which have propagated through the damaged and undamaged structures and around the noodle and arrived at a sensing location on a surface of the simulated structure;

generating an ultrasonic guided wave of the specified frequency which propagates through an actual curved composite laminate structure including a noodle having straight and curved adhesive bondlines, wherein the actual curved composite laminate structure has material properties which are the same as or similar to material properties of the simulated curved composite laminate structure;

converting ultrasonic guided waves which have propagated through the actual curved composite laminate structure and around the noodle and arrived at a sensing location on a surface of the actual curved composite laminate structure into measurement electrical signals;

processing the measurement electrical signals to derive measurement data representing an empirical wave characteristic;

storing measurement data representing the empirical wave characteristic in the non-transitory tangible computer-readable storage medium;

comparing the empirical wave characteristic represented by the measurement data to the simulated wave characterstics represented by the reference data; and classifying the noodle area as being damaged or not in dependence on the results of comparing the measurement data to the reference data.

21. The method as recited in claim 20, wherein if a determination is made that the noodle area is not damaged, then the actual curved composite laminate structure is neither repaired nor replaced.

22. The method as recited in claim 20, wherein if a determination is made that the noodle area is damaged, then a flag is generated and thereafter the damaged actual curved composite laminate structure is either repaired or replaced.

23. A structural health monitoring system comprising:

a wave generator, a pulser configured to send pulses to the wave generator, a wave sensor, a receiver configured to receive electrical signals from the wave sensor, and a computing system configured with simulation software, system control software for controlling the pulser and receiver, signal analysis software for analyzing signals output by the receiver, and a non-transitory tangible computer-readable storage medium;

wherein the simulation software is configured to enable the computing system to perform the following operations:

simulating an undamaged curved composite laminate structure including a noodle having straight and curved adhesive bondlines;

simulating propagation of an ultrasonic guided wave of a specified frequency which is guided through the undamaged structure and around the noodle by the straight and curved adhesive bondlines;

simulating respective damaged versions of the same structure having respective simulated defects of different types;

simulating propagation of an ultrasonic guided wave of the specified frequency which is guided through the damaged structure and around the noodle by the straight and curved adhesive bondlines; and storing reference data in a non-transitory tangible computer-readable storage medium, which reference data represents wave characteristics of simulated ultrasonic guided waves which have propagated through the damaged and undamaged structures and around the noodle and arrived at a sensing location on a surface of the simulated structure;

wherein the system control software is configured to enable the computing system to perform the following operations:

causing the wave generator to generate an ultrasonic guided wave of the specified frequency which propagates through an actual curved composite laminate structure including a noodle having straight and curved adhesive bondlines, wherein the actual curved composite laminate structure has material properties which are the same as or similar to material properties of the simulated curved composite laminate structure; and causing the wave sensor to convert ultrasonic guided waves which have propagated through the actual curved composite laminate structure and around the noodle and arrived at a sensing location on a surface of the actual curved composite laminate structure into measurement electrical signals;

wherein the signal analysis software is configured to enable the computing system to perform the following operations:

processing the measurement electrical signals to derive measurement data representing an empirical wave characteristic; and storing measurement data representing the empirical wave characteristic in the non-transitory tangible computer-readable storage medium; and wherein the system control software is further configured to enable the computing system to perform the following operations:

comparing the empirical wave characteristic represented by the measurement data to the simulated wave characteristics represented by the reference data; and classifying the noodle area as being damaged or not in dependence on the results of comparing the measurement data to the reference data.

* * * * *